United States Patent
Buckris et al.

(10) Patent No.: US 12,530,485 B2
(45) Date of Patent: Jan. 20, 2026

(54) SYSTEMS AND METHODS ENABLING THE QUANTUMIZATION OF DATA ARTICLES INTO QUANTUM DATA PARCELS VIA A DATA PARCEL EXCHANGE PLATFORM AND THE MODIFICATION OF QUANTUM DATA PARCEL INITIAL INTERNAL EXCHANGE VALUES UPON BEING RECEIVED BY DISPARATE RECEIVERS FROM AN INITIAL CONTROLLER

(71) Applicants: Ruben Buckris, Brooklyn, NY (US); Linda Buckris, Brookyln, NY (US)

(72) Inventors: Ruben Buckris, Brooklyn, NY (US); Linda Buckris, Brookyln, NY (US)

( * ) Notice: Subject to any disclaimer, the term of this patent is extended or adjusted under 35 U.S.C. 154(b) by 112 days.

(21) Appl. No.: 18/625,985

(22) Filed: Apr. 3, 2024

(65) Prior Publication Data

US 2024/0296246 A1  Sep. 5, 2024

Related U.S. Application Data

(63) Continuation-in-part of application No. 18/142,272, filed on May 2, 2023, now abandoned, which is a continuation-in-part of application No. 17/734,759, filed on May 2, 2022, now Pat. No. 11,675,925, which is a continuation-in-part of application No. 17/341,979, filed on Jun. 8, 2021, now Pat. No. 11,354,743.

(51) Int. Cl.
*G06F 21/62* (2013.01)
*G06F 21/64* (2013.01)

(52) U.S. Cl.
CPC ...... *G06F 21/6236* (2013.01); *G06F 21/6227* (2013.01); *G06F 21/64* (2013.01)

(58) Field of Classification Search
CPC ............. G06F 21/6236; G06F 21/6227; G06F 21/64; G06Q 40/04; G06Q 40/06; G06Q 30/08

See application file for complete search history.

(56) References Cited

U.S. PATENT DOCUMENTS

| | | | |
|---|---|---|---|
| 2003/0195822 A1* | 10/2003 | Tatge | G06Q 30/0635 705/37 |
| 2012/0185372 A1* | 7/2012 | McIntosh | G06Q 40/06 705/37 |
| 2017/0053131 A1* | 2/2017 | Modi | G06F 16/24575 |
| 2021/0264419 A1* | 8/2021 | Ratakonda | G06Q 20/389 |
| 2021/0392003 A1* | 12/2021 | Law | H04L 9/0897 |

\* cited by examiner

*Primary Examiner* — Shanto Abedin

(57) ABSTRACT

A system enabling the quantumization of data articles into quantum data parcels and the modification of quantum data parcel initial internal exchange values as they are received by disparate receivers from an initial controller.

20 Claims, 19 Drawing Sheets

SYSTEMS AND METHODS ENABLING THE QUANTUMIZATION OF DATA ARTICLES INTO QUANTUM DATA PARCELS VIA A DATA PARCEL EXCHANGE PLATFORM AND THE MODIFICATION OF QUANTUM DATA PARCEL INITIAL INTERNAL EXCHANGE VALUES UPON BEING RECEIVED BY DISPARATE RECEIVERS FROM AN INITIAL CONTROLLER

PRIORITY CLAIM

This is a continuation-in-part of and claims the benefit of and priority to U.S. non-provisional application Ser. No. 18/142,272, filed May 2, 2023, which in turn claims the benefit of and priority to U.S. non-provisional application Ser. No. 17/734,759, filed May 2, 2022, which in turn claims the benefit of and priority to U.S. non-provisional application Ser. No. 17/341,979, filed Jun. 8, 2021. The referenced applications are incorporated herein as if restated in full.

BACKGROUND

When the quantitative values of a data set are determined by informational events external to the data set or even external to the system in which the data set is created and used, the data set may experience a loss in its quantitative integrity. However, this issue is compounded by two factors: first, it is often necessary to send a data set from one computer to another computer, one account to another account, one network to another network, or one system to another system, and therefore the data sets cannot be entirely static. Often, data sets are exchanged and not always in their entirety, and in order to prevent a loss in total numerical value for multiple exchanged data sets, there must be a way to portion each data set in a reciprocal manner. Second, quantitative integrity is in one sense the maintenance of the precise numerical value of the data set, but in another sense it is merely the prevention of a decrease of the numerical value. Since informational events external to the data set may possibly increase the numerical value of the data set, a degree of exposure thereto may be desired. What is needed are algorithms that allow for balanced exchange of the data sets as well as control over the exposure of the data sets to informational events in order to not merely maintain the numerical value but also allow for their increase.

SUMMARY

This application describes a securitization, exposure, portioning, and exchange platform for enabling the securitization or fixing of quantitative values of data groups (i.e., a set of data assembled into a group based on sharing an underlying referrant, with one example of a data group being a data parcel, as will be defined), and the internal exchange of data parcels between account systems operating via computers over a network. The securitization of the quantitative values is achieved through a removal of the data parcels from exposure to data events external to the platform and is obtained via decoupling the data parcels from their external referrants. Data events may include a sudden increase or decrease in the external exchange value of assets to which a data parcel refers, and thus securitization protects the internal exchange value of data parcels which would otherwise be affected by the volatility of an external exchange value. Portioning of the data parcels allows for control over the degree of securitization and decoupling.

Internal exchange of the data parcels provides for maintaining the efficacy and value of the data parcels even after securitization and decoupling. The internal exchange of data parcels across account systems may be coordinated through the calculation and use of circulation data, which on the platform exists in a plurality of types. Since the circulation data coordinates the internal exchange of data parcels, the plurality of circulation data types enables the diversification of the means by which the data parcels are exchanged across account systems. Since different account systems are supported by different external accounts, and circulation data may be at least partially parameterized by the data found in those external accounts, the plurality of circulation types prevents an exchange prioritization of account systems that are coupled to one set of external accounts over account systems coupled to other sets of external accounts.

As the circulation data has utility within the system, there is a benefit in formalizing the circulation data as circulation data parcels. To distinguish circulation data parcels from data parcels generally, the data parcels may be referred to as asset data parcels.

The asset data parcels and circulation data parcels are not merely aggregates of data but are coupled to (or intentionally decoupled from) various real-world or external assets which have real-world or external value, and are created by accessing the accounts, external to the platform, which control the real-world assets. However, the relationship between the asset data parcels and circulation data parcels and the external assets is managed through an interaction of platform parameters controlled at least in part by users of the platform via their designated account systems, which are micro-networks consisting of their external accounts in communication with control over asset data parcels and circulation data parcels within the platform. When the relationship between the asset data parcels or the circulation data parcels and the external assets is severed (i.e., decoupled), originals of the asset data parcels and circulation data parcels become controlled by the platform and modified parallels data groups replace the originals in terms of account system control (i.e., following decoupling, the account system no longer controls the original but instead controls the modified parallel).

The platform provides for the exchange of control over originals and/or parallels between the various account systems of the platform and the platform itself. Since originals maintain their parameterized relationship with external assets, control over an original provides control over the external asset because the platform, by accessing the external accounts which partially form the account systems and communicating instructions thereto, effects changes in external asset ownership. Even though the parallel no longer maintains the strict parameterized relationship with external assets, it may continue to refer to the external asset and may obtain a partially parameterized relationship with the external asset.

DETAILED DESCRIPTION

Figure 1:
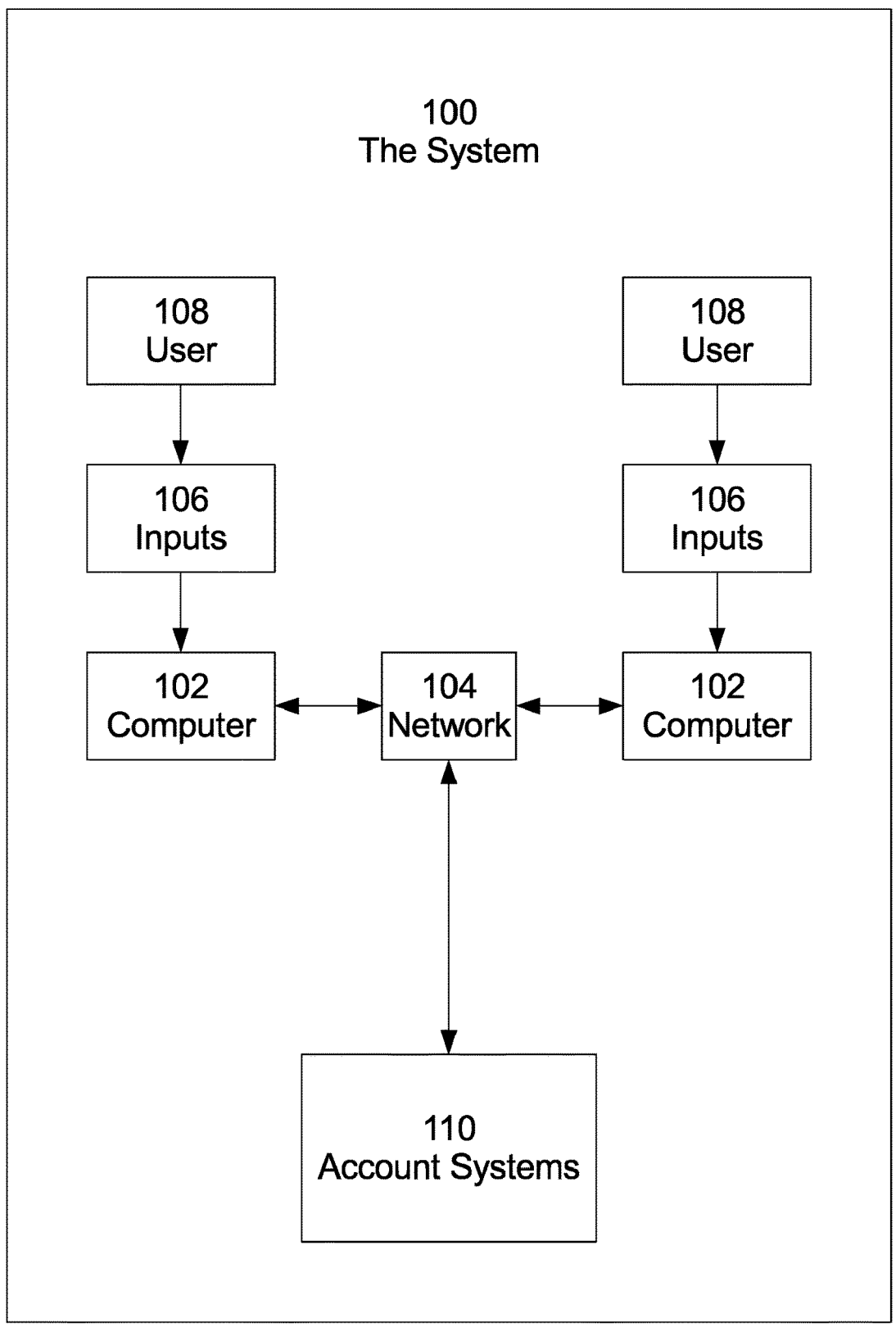
FIG. 1 shows an exemplary system architecture.

As shown in FIG. 1, the system 100 comprises a set of computers 102 connected over a network 104. "The system" may refer hereon to the system as a whole or a part thereof. The system may provide a platform accessible to users for requesting one or more actions to be taken by the system or for viewing data handled by the system. The system may, through the computers and via the network, perform one or more methods in response to requests by the users or in accordance with internal system requirements and logic.

A set of computers may refer to one or more conventional computers such as desktop or laptop computers, a smart device such as a smart phone, smart watch or tablet, a dedicated device which is designed exclusively for the platform described herein, or a combination of conventional computers, smart devices, and dedicated devices. Each of these computers may comprise a set of inputs 106 to be manipulated or defined by users 108, a set of processors, processing memory, storage drives, and/or display screens. Inputs may include mouse and keyboard, touchpad, microphone, card reader, RFID or NFC tag reader, etc. A set of computers may refer hereon to a plurality of such computers or a single computer thereof.

Figure 2:
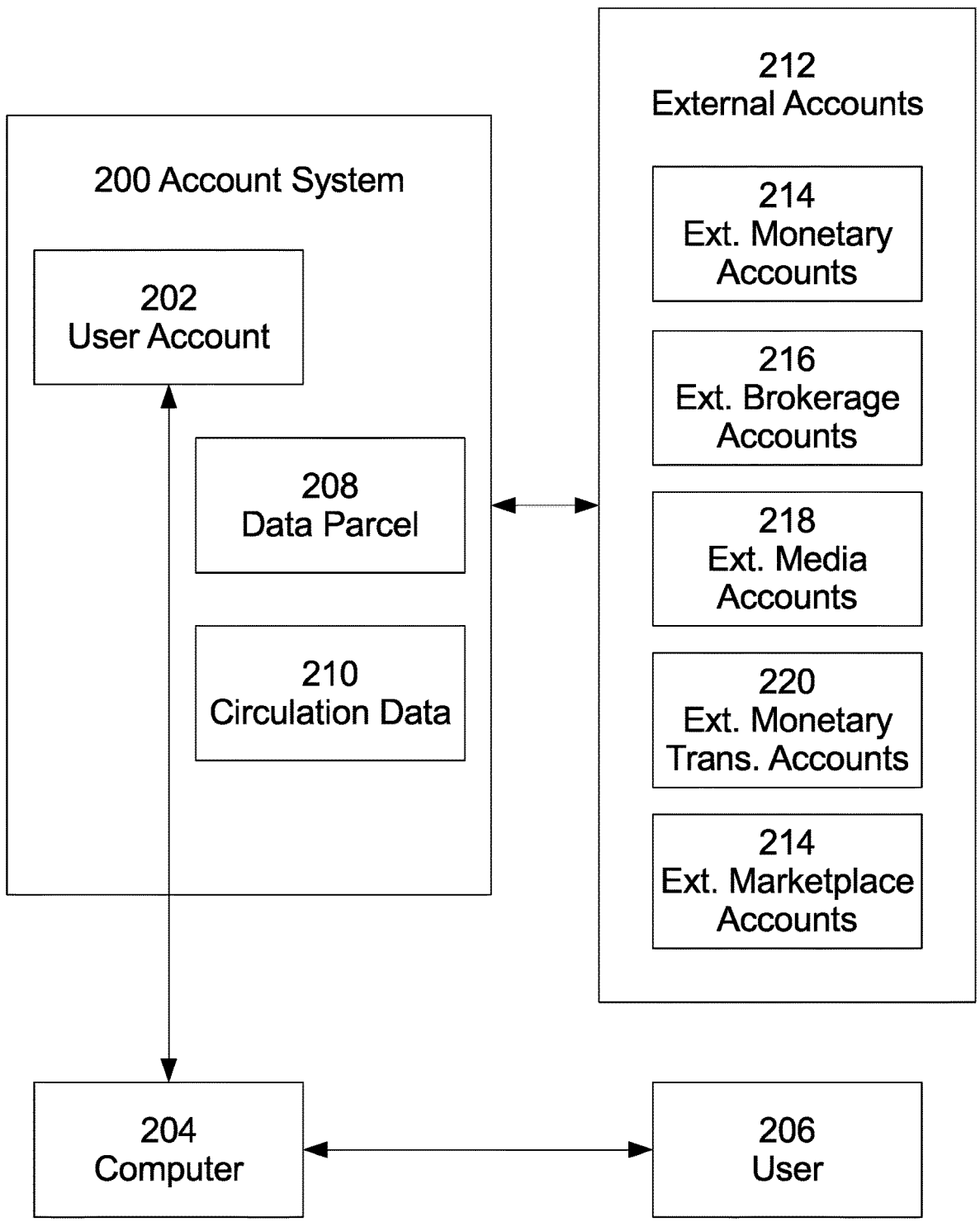
FIG. 2 shows an exemplary account system architecture.

The network may be a private network only accessible by providing satisfactory login credentials and/or a public network, such as the internet. A set of account systems 110 may be stored across and accessible by the set of computers operating over the network. An account system is an account which is able to assertively engage with (i.e., receive and transmit information, including instructions) one or more external accounts, permissively engage with other account systems (i.e., request to receive and exchange information and/or asset data parcels and circulation data parcels) and is configured to be assigned control over asset data parcels and circulation data parcels. External accounts are accounts which are primarily accessed outside the present platform via other platforms. As shown in FIG. 2, an account system 200 may refer to one or more user accounts 202 accessible via the set of computers 204. Each account system is generally owned or otherwise accessed by a particular user 206, with the user being able to access the account system via the set of computers, such as via a laptop, a smart phone, and a dedicated device. The system may have any number of account systems, such as ten, one hundred, one thousand, or more, depending on the number of users. Each account system revolves around access to and manipulation of various asset data parcels 208 and circulation data parcels 210, as will be defined. In addition to using the set of computers, the user may be required to enter satisfactory login credentials, such as a username and password, or biometric data, such as a fingerprint or voice signature. An account system may be integrated with or coupled to one or more external accounts 212, such as external monetary accounts 214 which handle users' monetary information, receive and store incoming funds and permit the transfer of those funds upon receiving authorization from the users, external brokerage accounts 216 which hold, purchase, and sell financial assets such as securities on behalf of the users, external media accounts 218, which display media such as posts or videos posted by users and which generally permit users to communicate with each other, external monetary transfer accounts 220, which are typically coupled to external monetary accounts and permit users to transfer and receive funds from and to their external monetary accounts, and external marketplace accounts 222, which permit users to buy and sell various non-financial assets. External monetary accounts may include bank accounts, external brokerage accounts may include brokerage and investment accounts, external media accounts may include social media accounts, and external transfer accounts may include payment platforms.

The coupling of an account system to an external account may be achieved upon receiving from a user the login credentials for the external account via an interface within the system platform and receiving permission to keep such credentials saved with the account system. The login credentials may then be entered by the system via an API. The system itself may also have its own account system—i.e., an administrative account system. This administrative account system may be referred to as a "system account system" (from hereon, SAS) and is not owned or accessed by any particular user but can nonetheless interact with other account systems the way other account systems can interact with each other, as will be described.

An asset data parcel is a collection of data that may be conveyed from one set of computers to another set of computers but is generally controlled by a single account system. The asset data parcel may have a title parameter, which identifies the current account system for which permission is given to make decisions regarding the asset data parcel. Generally, the title parameter for a given asset data parcel identifies only a single account system, and no other account system may make decisions respecting that given asset data parcel, although another account system may request the identified account system to make a particular decision, usually in the context of changing title parameters which determine control, as will be described. The asset data parcel may have a reference identity parameter, with the reference identity indicating an asset such as a physical object, such as a particular make and model of a car, or a non-physical object, such as a particular corporate stock. The reference identity parameter may indicate both an instance of an asset as well as the asset class—for example, an asset may be instantiated as a particular make and model of a car and classified as a vehicle and/or physical asset, with both the instantiation and classification included in the reference identity parameter.

The asset data parcel may have a reference quantity, with the reference quantity indicating the quantity of the asset indicated by the reference identity parameter—for example, the reference quantity could correspond to the number of referenced cars or stocks. The asset data parcel may have an external exchange value parameter, with the external exchange value parameter indicating an external exchange value of the asset. For example, a particular stock may have an external exchange value of $300 if it can be purchased outside the system for $300. Thus, the external exchange value may be detected by the system but is not controlled by the system. The reference identity, reference quantity, and external exchange value parameters may be set by an administrator of the system or received by the system from a separate system, network, database, organization, or institution.

The asset data parcel may have an internal exchange value parameter, which identifies the exchange value of the asset data parcel within the system, with exchange being a process of changing the title parameters between two asset data parcels or circulation data parcels (which will be discussed below). The internal exchange value is initially set as the external exchange value parameter), but the internal exchange value parameter may diverge from the external exchange value parameter, as will be discussed. The internal exchange value is generally processed by the system in relation to circulation data, such that circulation data serves as the measurement unit for the internal exchange value parameter. The internal exchange value parameter is anchored to a reference quantity of 1, and therefore a total internal exchange value would be calculated by the system as the internal exchange value parameter times the reference quantity parameter.

An asset data parcel may have a security parameter, which is a binary parameter indicating whether the internal exchange value parameter is fixed to the external exchange value parameter. The security parameter is set by the account system in order to secure the existing value of the asset data parcel. More precisely, securing an asset data parcel will freeze its current internal exchange value. Thus, if the security parameter is FALSE, then the internal exchange value at least initially equals the external exchange value parameter, but if the security parameter is TRUE, then the internal exchange value is fixed by the system at its current value, and consequently is permitted to diverge from the external exchange value if the external exchange value increases or decreases from its initial value. Here, TRUE corresponds to -secured- and FALSE corresponds to -unsecured-, but these terms are merely conventional and could be represented by -0- and -1- or any other binary construction.

In one variation, upon receiving a request to change the security parameter of an asset data parcel from FALSE to TRUE, the system creates an asset data parcel parallel, which is a modified copy of the original asset data parcel. The asset data parcel original and asset data parcel parallel are the same, except the title parameter of the asset data parcel original is changed to SYSTEM while the asset data parcel parallel is set as the originally identified account system. The security parameter of the asset data parcel original is set to FALSE while the asset data parcel parallel is changed to TRUE. Thus, SAS gains control over the asset data parcel original and the account system which requested the change is assigned the newly created asset data parcel parallel. Aside from their origin, asset data parcel parallels are treated by the system as regular asset data parcels and will be not hereon be distinguished from regular asset data parcels. In one variation, as will be described, since control over the asset data parcel original is changed from the account system to SAS, instructions will be transmitted to the external account system controlling the asset referenced by the asset data parcel original to sell or transmit the asset to an external account coupled to SAS.

In one variation, when an account system changes the security parameter between TRUE and FALSE, the system may divert a portion of the quantity toward (newly created) asset data parcels controlled by SAS. While this results in an integrity loss to the asset data parcel, the system as a whole maintains integrity because a new asset data parcel may be created to receive the quantity or percentile of exchange value. For example, if an account system changes a security parameter of an asset data parcel from FALSE to TRUE, an asset data parcel parallel may be created, the quantity parameter of the asset data parcel may be reduced by -x-, and the quantity parameter of the asset data parcel parallel may be set to -x-. In one non-mutually exclusive variation, an asset data parcel parallel may be created if the account system changes a security parameter of an asset data parcel to, or back to, FALSE, with the asset data parcel parallel quantity parameter set to -x- and the asset data parcel quantity parameter subtracted by -x-.

In one variation, if the account system assigned the asset data parcel parallel requests the security parameter to be changed from TRUE to FALSE, no additional asset data parcel parallel is created, and nor is the asset data parcel original assigned back to the requesting account system. Instead, changes in the internal exchange value of the asset data parcel original, upon being detected, are quantified as percentile changes (i.e., +/−x %), and then the internal exchange value of the asset data parcel parallel is changed according to the same percentile change. Thus, if the internal exchange value of an asset data parcel original changes from 100 to 150 (i.e., an increase of 50%), and if the security parameter of the asset data parcel parallel is 200, then the internal exchange value of the asset data parcel parallel will be changed from 200 to 300. Thus, the asset data parcel parallel is desecuritized and exposed to the volatility of the external exchange value of the asset referenced by the reference identity parameter.

In one embodiment, if a asset data parcel security parameter is changed from TRUE to FALSE, the internal exchange value parameter will again begin to follow the external exchange value, and match its change in value. Thus, if the external exchange value increases, so too will the internal exchange value. If the external exchange value decreases, so too will the internal exchange value. The increase or decreases is proportionate, such that if the external exchange value increases by 20%, the internal exchange value will also increase by 20%. Thus, if the security parameter of a asset data parcel is initially set to FALSE, the internal exchange value and external exchange value should be nearly identical; upon changing the security parameter to TRUE, the internal exchange value will cease to change based on the external exchange value. If the security parameter is changed back to FALSE, the internal exchange value will rise or fall proportionately with the external exchange value, even if the values themselves are no longer the same.

Figure 3A:
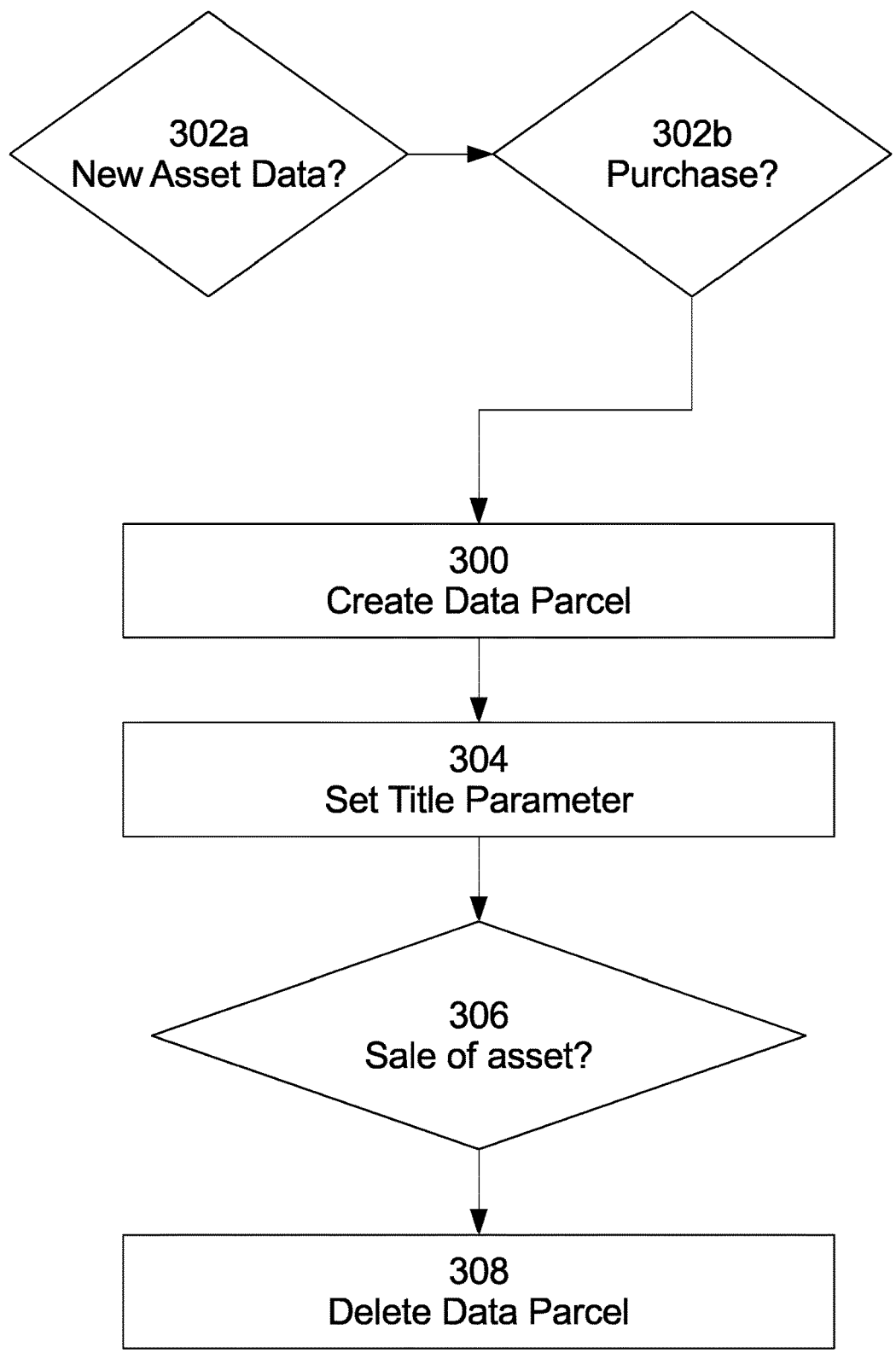
FIG. 3a is a flowchart showing an exemplary asset data parcel creation and deletion method.

As shown in FIG. 3a, an asset data parcel may be created 300 upon receiving new asset data from an external account 302a. The new asset data may comprise data pertaining to a purchase made via an external account 302b, such as the purchase of securities by an external brokerage account or of an automobile or a house in an external marketplace account. The title parameter may be set automatically 304 based on the account system coupled to the external accounts from which the new asset data is received. If the system receives new asset data from an external account pertaining to the sale of an asset indicated by the reference identity 306, then the asset data parcel may be deleted 308.

Figure 3B:
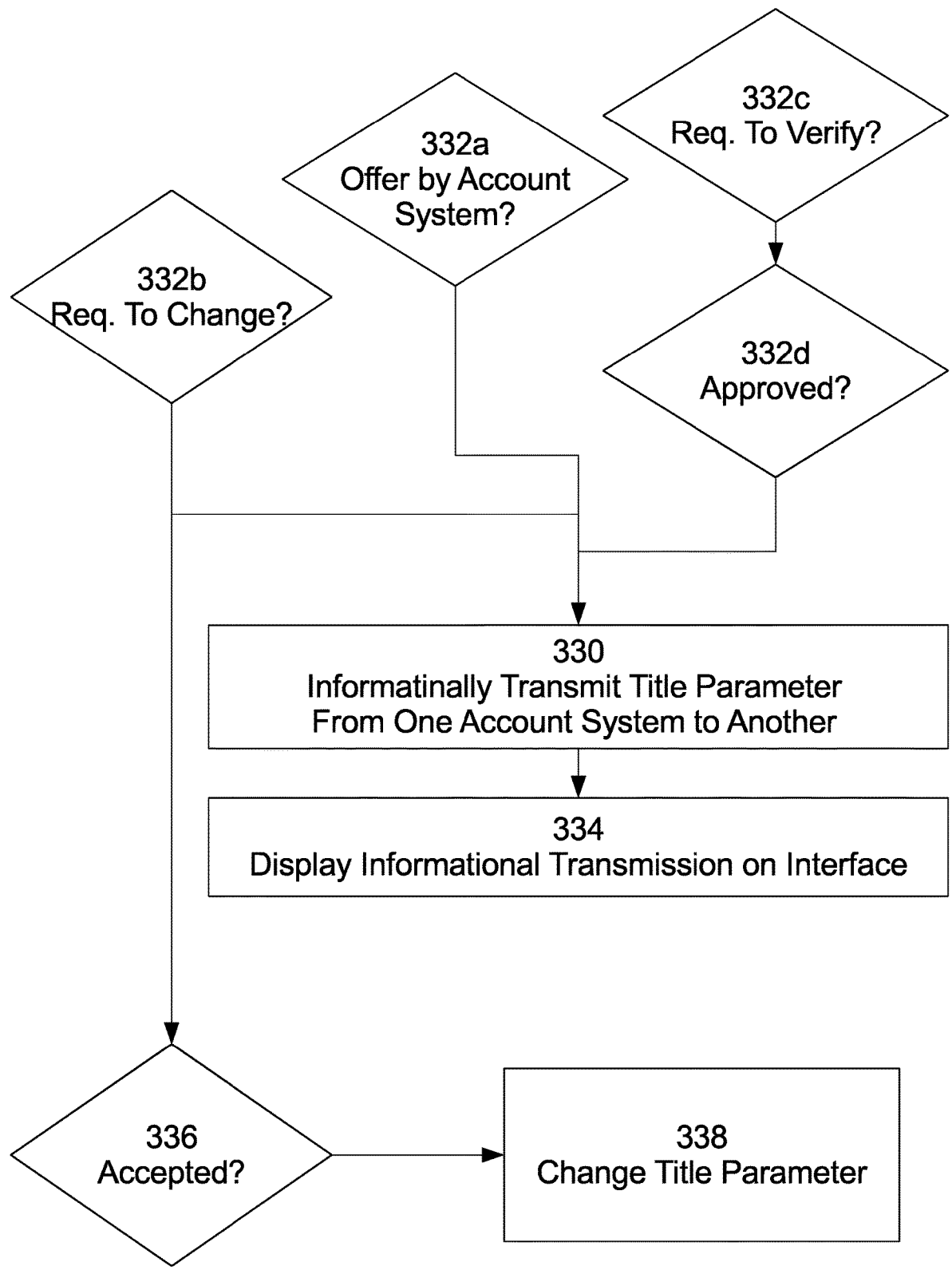
FIG. 3b is a flowchart showing an exemplary asset data parcel title transmission and change method.

As shown in FIG. 3b, the title parameter of an asset data parcel may be informationally transmitted 330 from one account system (the account system identified by the title parameter, i.e., the identified account system) to another account system if an offer to change the title parameter (and thus, control) from the identified account system to the other account system is made by the identified account system to the other account system 332a, or if a request to obtain control is sent by the other account system to the identified account system 332b, or if a request to merely verify the title parameter (and thus verify control) is requested 332c. A request to verify the title parameter may require approval from the identified account system 332d before informational transmission of the title parameter occurs. The informational transmission may be thereafter displayed on an interface for a user of the other account system to see 334. If the offer or request for change are accepted 336, then the title parameter is in fact changed from the identified account system to the other account system (the newly identified account system) 338.

Figure 3C:
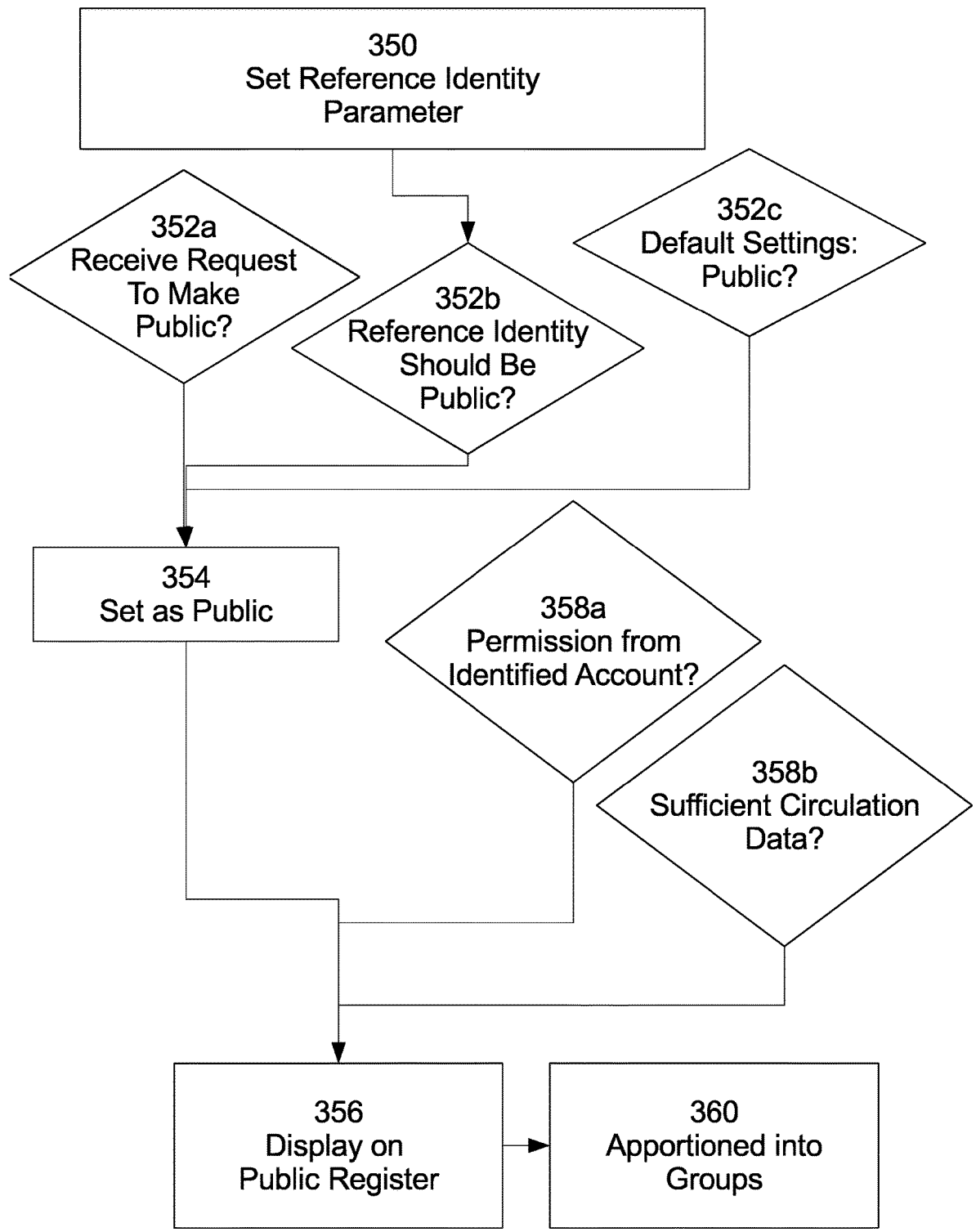
FIG. 3c is a flowchart showing an exemplary asset data parcel display method.

As shown in FIG. 3c, the reference identity parameter may be initially set 350 by the system based on the new asset data discussed earlier. The system may receive a request from the identified account system to make the asset data parcel public or private 352a or may automatically set the asset data parcel as private or public based on the reference identity parameter 352b and/or default settings for the class of reference identity set in the identified account system 352c. The public/private setting may be saved as a visibility parameter associated with the asset data parcel. If an asset data parcel is set as public 354, it may be displayed along with other parameters of the asset data parcel in a public register 356b. These other parameters may include the title parameter, the reference identity parameter, the reference quantity, the external exchange value parameter, the internal exchange value parameter, and/or the security parameter. The public register may be displayed on an account system interface. A given asset data parcel set as public may be displayed on the account system interface 356a if the accessing account system has permission from the identified account system 358a or if the viewing account system has a circulation data parcel with a quantity parameter and/or internal exchange value deemed sufficient by the system such that the identified account system might receive authorization to change the title parameter from the identified account system to the accessing account system 358b. The display of the public register may be apportioned into separate interface tabs, columns, or other organizational display divisions 360, with apportionments applied in order to group identified account systems, reference identities, reference identity classes, etc.

Figure 3D:
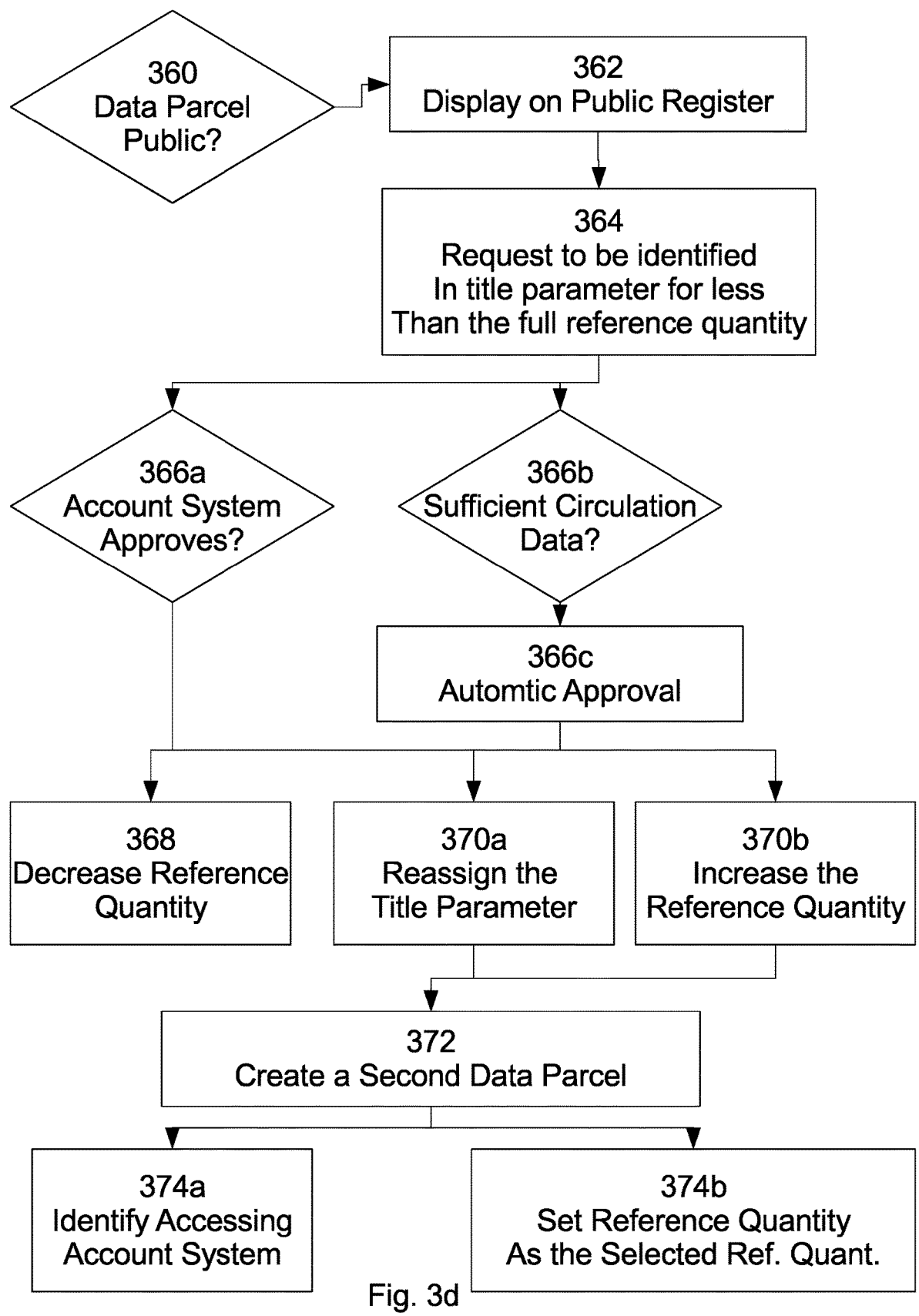
FIG. 3d is a flowchart showing an exemplary partial asset data parcel exchange and creation method.

As shown in FIG. 3d, a first asset data parcel may have its reference quantity changed while simultaneously a second asset data parcel may be created. If a first asset data parcel is set to public 360 it will be displayed on a public register 362. An accessing account system may request to be identified in the asset data parcel title parameter for less than the full reference quantity (a selected reference quantity) 364. The currently identified account system may approve 366a or the system may automatically approve 366c based on a calculation involving the sufficiency of the circulation data parcel with a title parameter identifying the accessing account system 366b. The system will then decrease the reference quantity by the selected reference quantity 368, reassign the title parameter of the circulation data parcel to the identified account system 370a or increase the reference quantity of the circulation data parcel which already identifies the identified account system and decreases the reference quantity of the circulation data parcel which identifies the accessing account system 370b, and create a second asset data parcel matching the parameters of the first asset data parcel 372, except for the title parameter, which will identify the accessing account system 374a, and the reference quantity, which will be set as the selected reference quantity 374b.

Figure 3E:
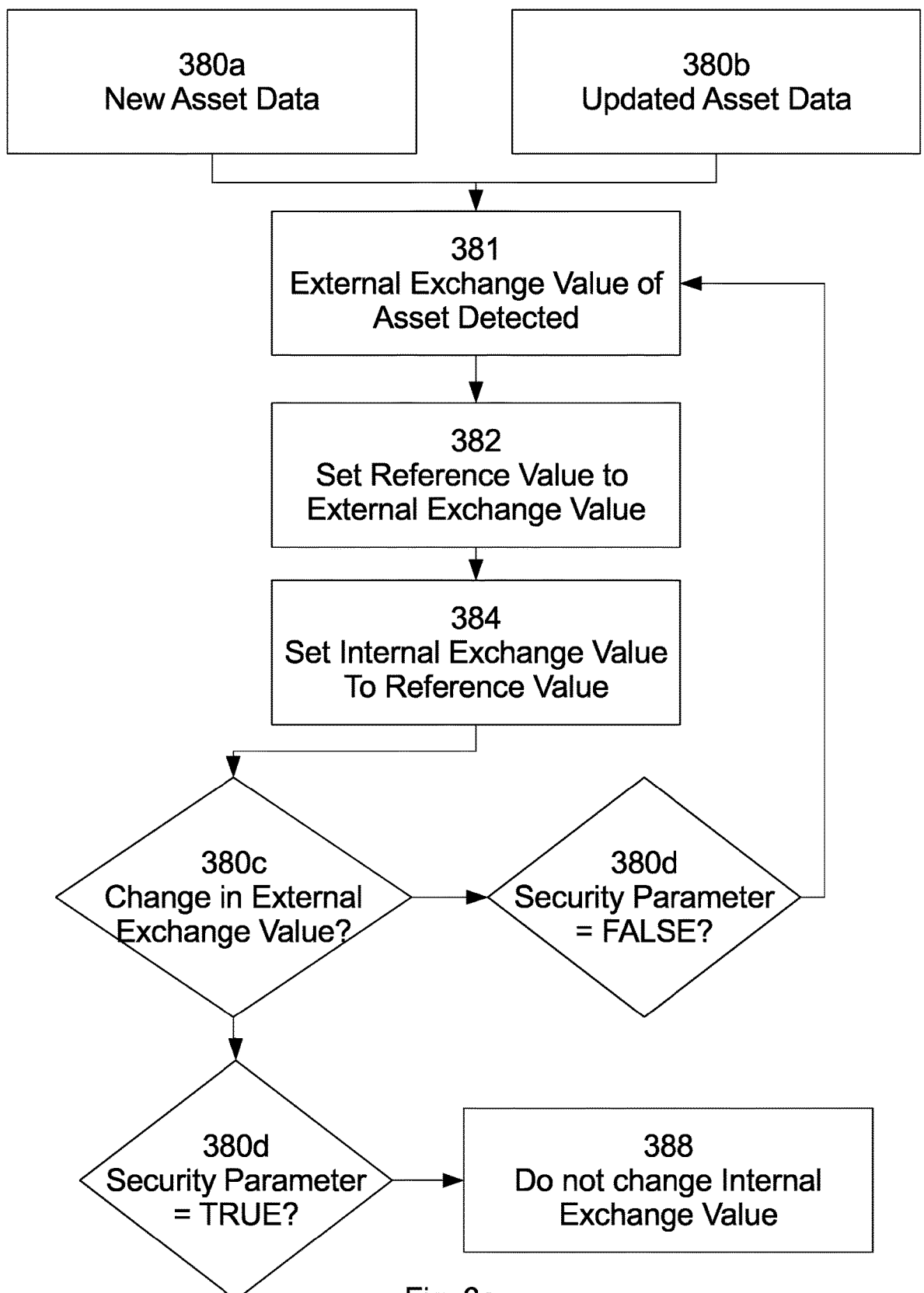
FIG. 3e is a flowchart showing an exemplary asset data parcel securitization method in which control over a first asset data parcel is given to SAS and a second asset data parcel is created for the account system.

As shown in FIG. 3e, the external exchange value of the asset referenced by the referenced identity of an asset data parcel may be initially detected 381 by the system based on the new asset data 380a or based on updated asset data 380b, with the updated asset data also obtained from an external account and pertaining to assets identified by the reference identity parameter. The external exchange value parameter may be initially set to the external exchange value 382 and the internal exchange value parameter may be set to the external exchange value parameter 384. If a change is the external exchange value is detected by the system based on updated asset data 380c and the security parameter is set to FALSE 380d, then the external exchange value parameter is set to the new external exchange value and the internal exchange value is set to the external exchange value parameter. However, if the security parameter is changed from FALSE to TRUE 380e, then even if a change in the external exchange value is detected by the system 380c and the external exchange value parameter changes, the internal exchange value will not change 388.

Figure 3F:
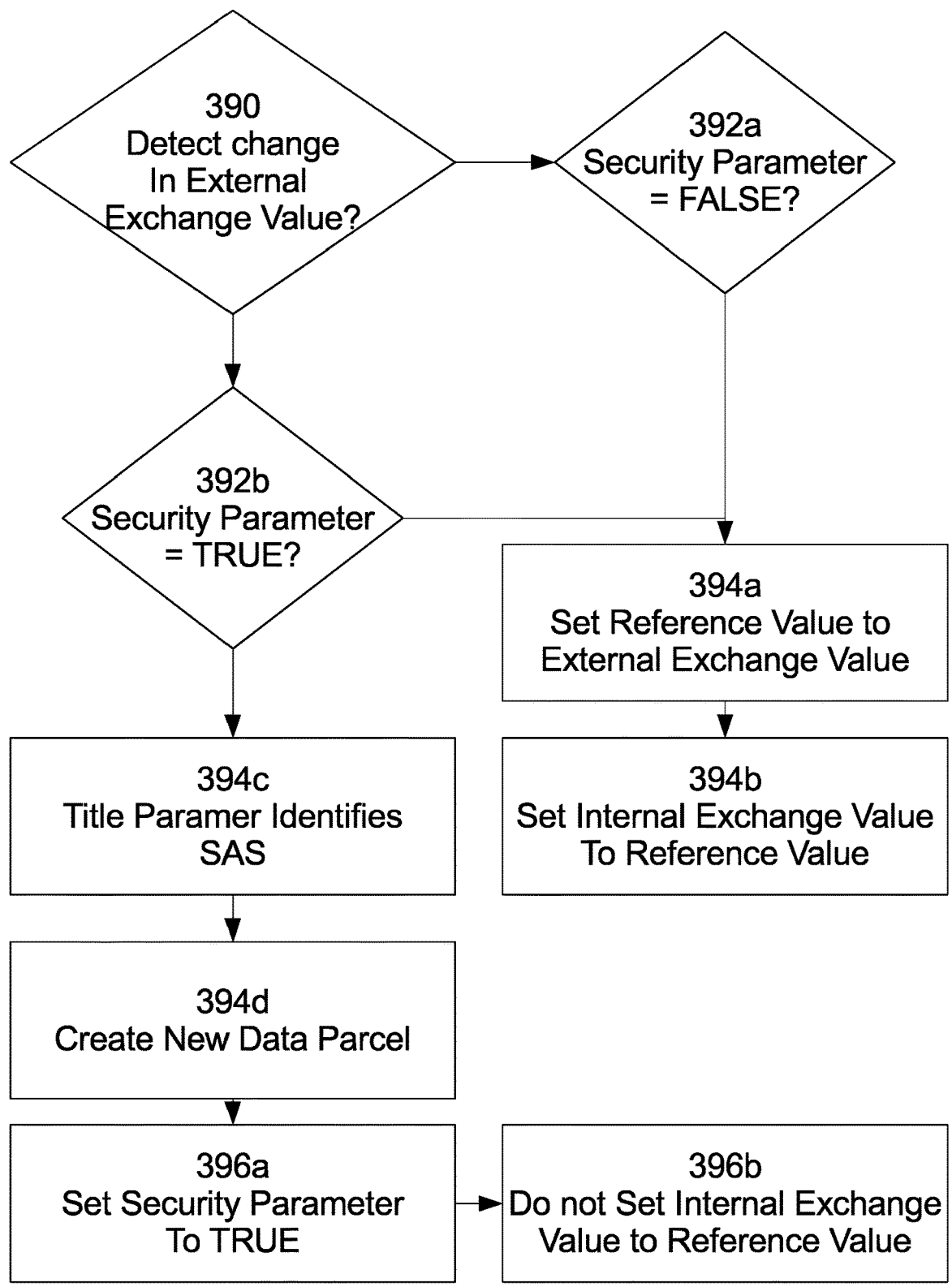
FIG. 3f is a flowchart showing an exemplary data parcel securitization.

In one variation, as shown in FIG. 3f, if a change is the external exchange value of an asset data parcel is detected by the system based on updated asset data 390 and the security parameter is set to FALSE 392a, then the external exchange value parameter is set to the new external exchange value 394a and the internal exchange value is set to the external exchange value parameter 394b. However, if the security parameter is changed from FALSE to TRUE 392b, then if a change in the external exchange value is detected by the system 390 and the external exchange value parameter changes 394a, the internal exchange value will be set to the external exchange value 394b, the title parameter will change to identify SAS 394c, a new asset data parcel (an asset data parcel parallel) will be created 394d identical to the original asset data parcel including the original title parameter, except that the security parameter is set to TRUE 396a and the internal exchange value will not be changed 396b even if the external exchange value changes 390 and the external exchange value parameter changes 394a.

Circulation data is a uniform data type which is handled by the system according to title parameters and quantity parameters. The title parameters and quantity parameters indicate the account system under which given circulation data parcels are controlled and the quantity thereby controlled. Circulation data parcels may have a quantity parameter of any number, but a single unit of circulation data must have a quantity parameter of one. Circulation data is fungible, in that what is defined as a single unit of circulation data of any given type is equal to and can be replaced by or exchanged with another unit of circulation data of the same type. A circulation data parcel may be portioned, i.e., divided into sets of differing units, and the title parameters may be changed from one account system to another. In one embodiment in which there is only one type of circulation data, circulation data parcels do have internal exchange values, but they are not parameterized because the internal exchange values of asset data parcels are measured by circulation data parcel quantities, and thus the circulation data parcel internal exchange values are functionally equivalent to their quantity parameters. In another embodiment, the system has multiple circulation data types, nominally referenced as circulation type one, circulation type two, and so on. In this version, the internal exchange values of asset data parcels are measured by quantities of a designated circulation data type and each circulation data type has an internal exchange value measured by the quantity of the same designated circulation data type.

Figure 4A:
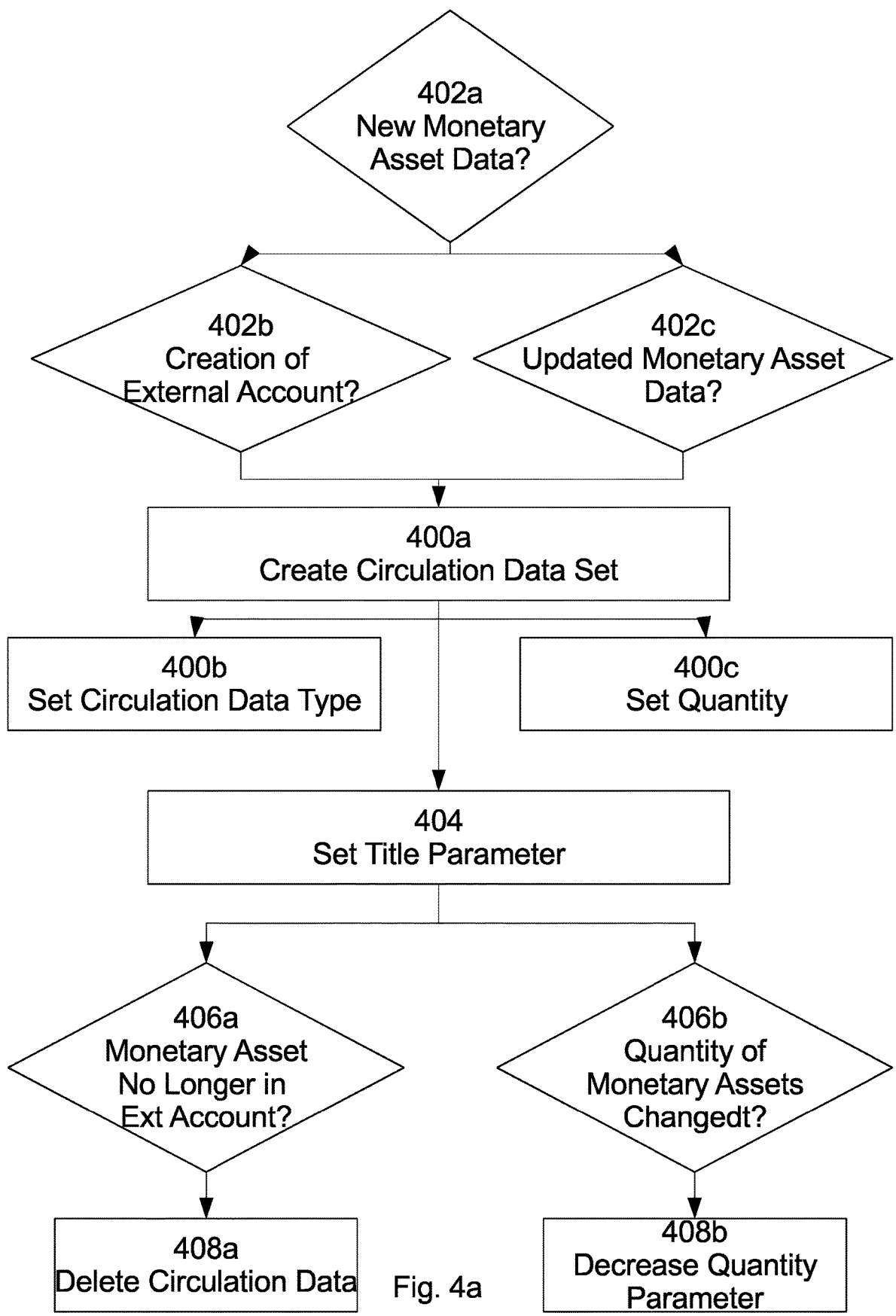
FIG. 4a is a flowchart showing an exemplary circulation data parcel creation, deletion, and quantity reduction method.

As shown in FIG. 4a, circulation data parcels may be created 400a and the circulation data type 400b and quantity set 400c upon receiving new monetary asset data from an external account 402a, particularly an external monetary account or an external monetary transfer account. The new monetary asset data may comprise data pertaining to the creation of an external account 402b, such as the creation of an external monetary account or external monetary transfer account with identification of the initial funding thereof, or based on updated monetary asset data 402c, with the updated monetary asset data also obtained from an external account and pertaining to changes to existing monetary assets. The title parameter may be set automatically 404 based on the account system coupled to the external accounts from which the new monetary asset data is received. If the system received new monetary asset data from an external account indicating that the basis for the circulation data parcel no longer exists, e.g., the monetary assets are no longer in the external account 406a, then the system may delete the circulation data parcel 408a. If the new monetary asset data indicates that the underlying quantity of the monetary assets has changed 406b, then the system may proportionately decrease the quantity 408b.

Figure 4B:
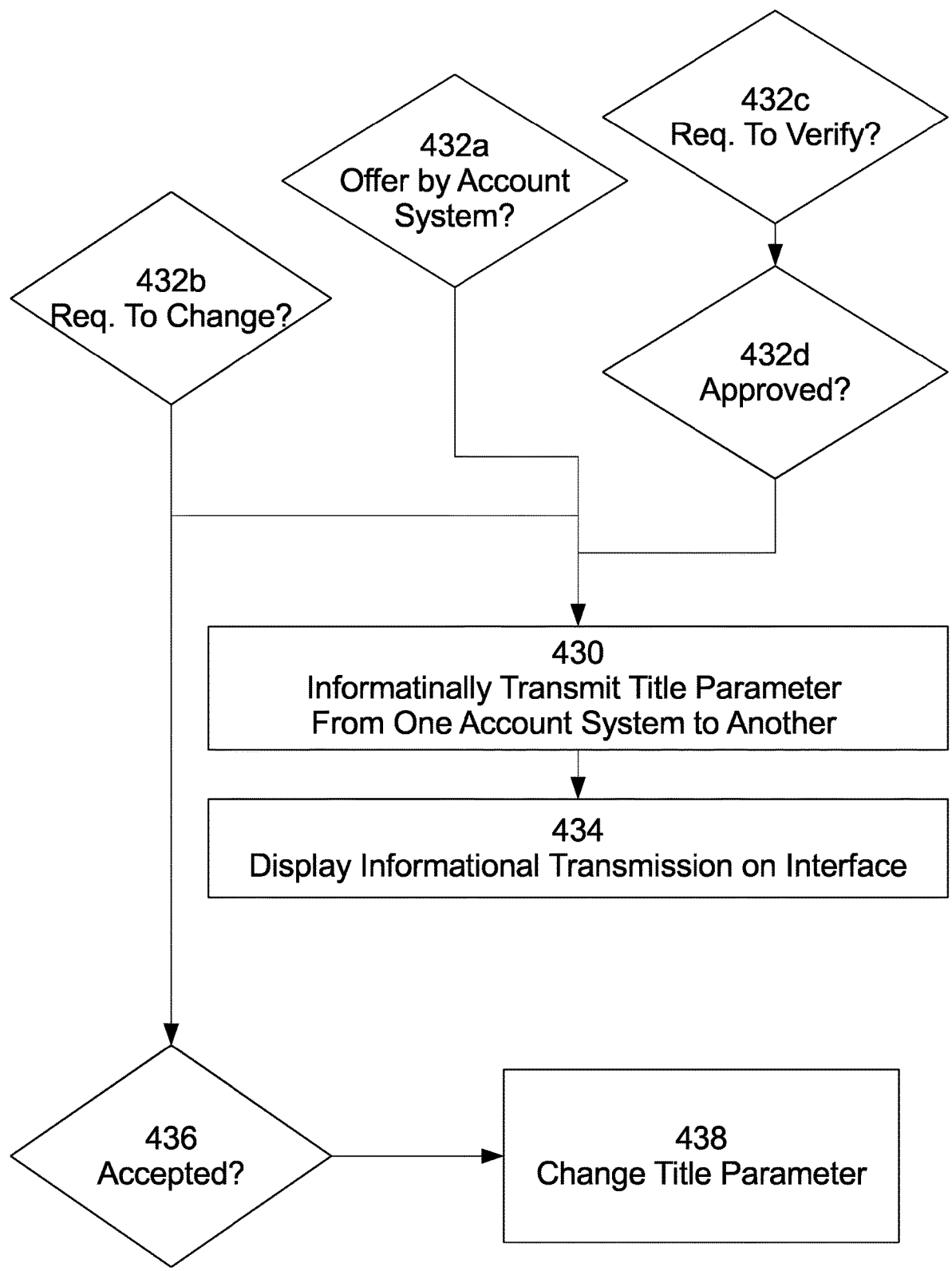
FIG. 4b is a flowchart showing an exemplary circulation data parcel title transmission and change method.

As shown in FIG. 4b, the title parameter of a circulation data parcel may be informationally transmitted 430 from one account system (the account system identified by the title parameter, i.e., the identified account system) to another account system if an offer to change the title parameter from the identified account system to the other account system is made by the identified account system to the other account system 432a, or if a request to change the title parameter is sent by the other account system to the identified account system 432b, or if a request to merely verify the title parameter is requested 432c. A request to verify the title parameter may require approval from the identified account system 432d before informational transmission of the title parameter occurs. The informational transmission may be thereafter displayed on an interface for a user of the other account system to see 434. If the offer or request for change are accepted 436, then the title parameter is in fact changed from the identified account system to the other account system (the newly identified account system) 438.

Figure 4C:
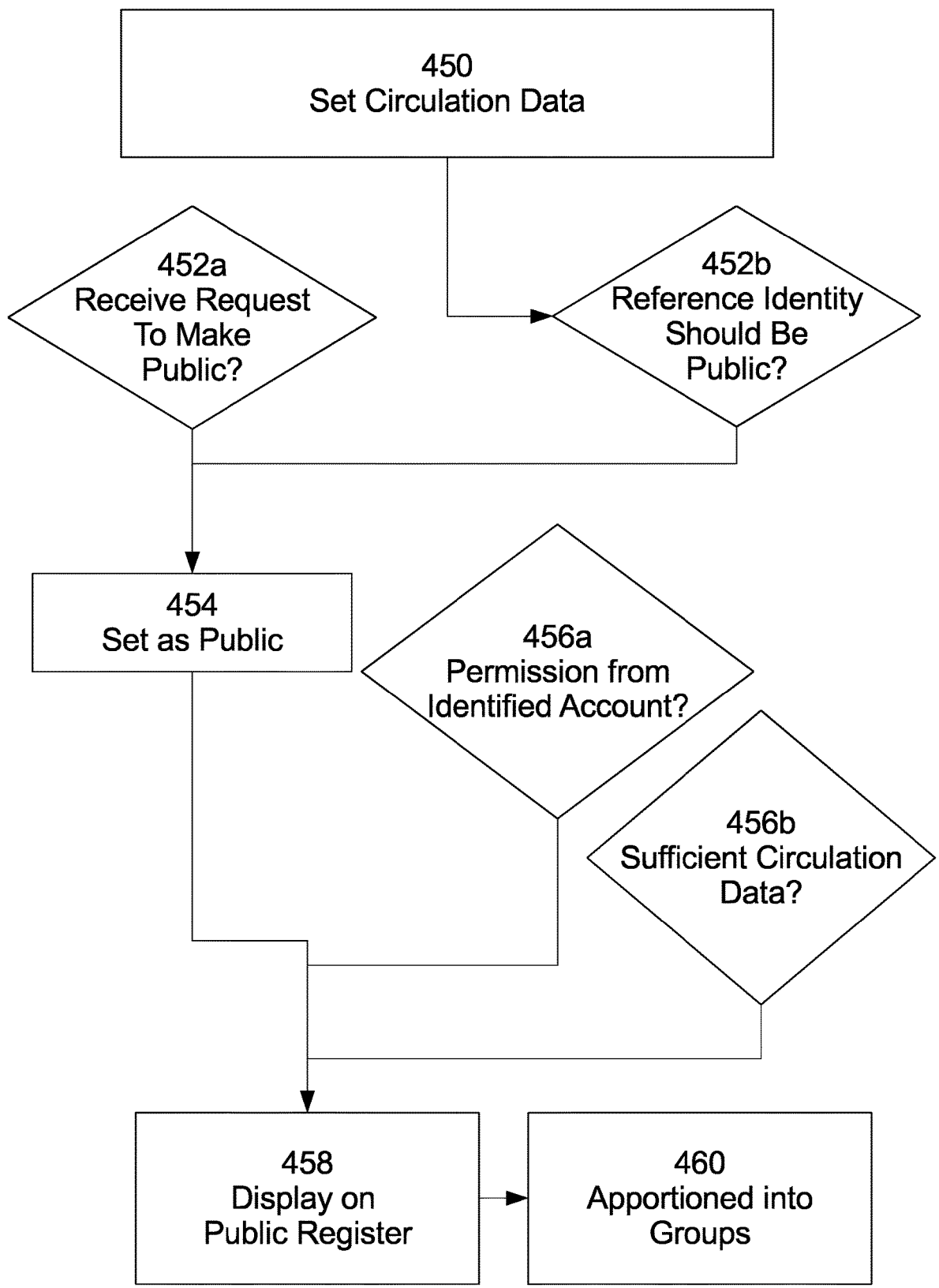
FIG. 4c is a flowchart showing an exemplary circulation data parcel display method.

As shown in FIG. 4c, the circulation data type for a circulation data parcel may be initially set 450 by the system based on the new monetary asset data discussed earlier. The system may receive a request from the identified account system to make the circulation data parcel public or private 452a or may automatically set the circulation data parcel as private or public based on the circulation data type 452b. The public/private setting may be saved as a visibility parameter associated with the circulation data parcel. If a circulation data parcel is set as public 454, it may be displayed along with other parameters of the circulation data parcel in a public register 458. These other parameters may include the title parameter, the circulation data type, the quantity, the internal exchange value parameter, and/or the security parameter. The public register may be displayed on an account system interface. A given set of circulation data parcels set as public may be displayed on the account system interface 456b if the accessing account system has permission from the identified account system 458a or if the viewing account system has circulation data parcel with a quantity parameter and/or internal exchange value deemed sufficient by the system such that the identified account system might receive authorization to change the title parameter from the identified account system to the accessing account system 456b. The display of the public register may be apportioned into separate interface tabs, columns, or other organizational display divisions 460, with apportionments applied in order to group identified account systems, reference identities, reference identity classes, etc. Display of circulation data parcels may be color coded according to circulation data type.

Figure 4D:
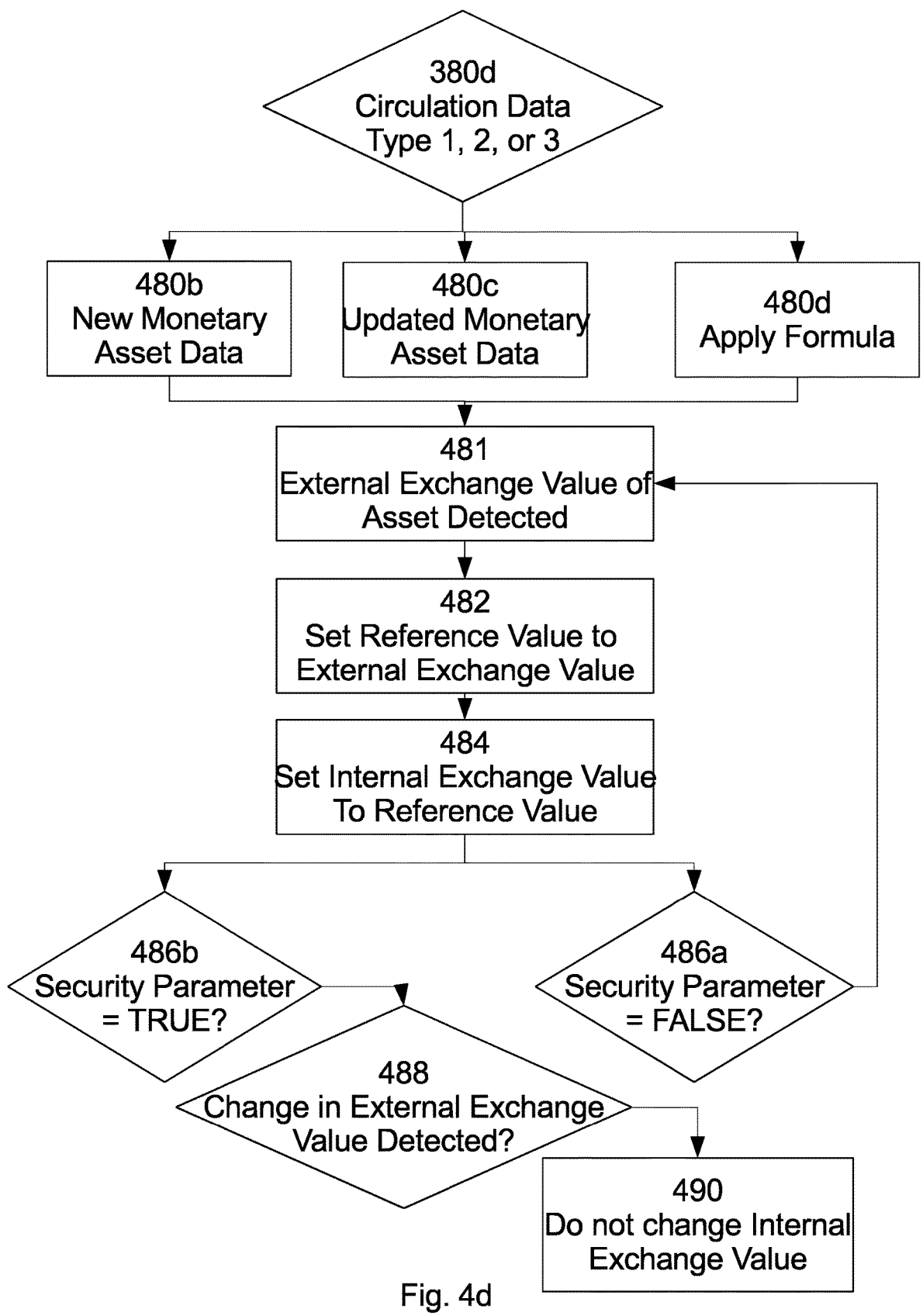
FIG. 4d is a flowchart showing an exemplary circulation data parcel securitization method.

As shown in FIG. 4d, depending on circulation data type 480a, the external exchange value of a set of circulation data may be initially detected or determined 481 by the system based on the new monetary asset data 480b, based on updated monetary asset data 480c, based on formulas set by the system and which take into account the relative external exchange values of various currencies, commodities, and securities 480d, or based on formulas set by the system and which take into account the relative internal exchange values of various circulation data types. The updated monetary asset data may be also obtained from an external account and pertaining to monetary assets corresponding to the circulation data type. The formulas enable the calculation of internal exchange values and may be updated based on currency, commodities, and securities data such as the value of the US dollar vis-á-vis the Euro, the value of gold vis-a-vis silver, and/or the value of a particular stock or set of stocks in terms of a particular currency. Thus, certain circulation data types may have their internal exchange values based on qualities pertaining to the monetary assets described by the new monetary asset data whereas other circulation data types may have their internal exchange values based on system formulae.

In one embodiment, one circulation type, as manifested in circulation data parcels, is used by the system as a standard by which all internal exchange values are calculated. This circulation type, which may be referred to as the "standard circulation data type", has a value set by the system using a formulae utilizing the relative value of fiat currencies, cryptocurrencies, commodities, and securities.

The system may determine the isolated value of a single fiat currency by an established evaluation method or combination thereof, such as by multiplying the fiat currency's trade volume (in USD) by the amount of the fiat currency held in foreign exchange reserves (in USD). The value of a set of fiat currencies can be added together. The set may include: the fiat currencies of all countries recognized officially by the United Nations, the IMF, or other governing international body, the top fiat currencies (such as the top three, the top five, or the top ten, at the discretion of the administrators), or the fiat currencies which constitute at least some percentile of daily trade volume (such as at least 10%).

The system may similarly determine the isolated value of a commodity be an established evaluation method or combination thereof, such as by multiplying the commodity's exchange value (of one unit of the commodity vis-a-vis USD) by the amount held in government reserves (in the US or internationally), by the daily trade volume. The value of a set of commodities can be added together. The set may include: all of the commodities available on one or more exchanges, or the top commodities, or the commodities which constitute at least some percentile of daily trade volume.

The system may determine the isolated value of a cryptocurrency or other non-fiat currency by multiplying the number of the cryptocurrency coins by their exchange value. The value of a set of cryptocurrencies can be added together. The set may include: all of the cryptocurrencies available on one or more exchanges, or the top cryptocurrencies in terms based on their value in USD, or the cryptocurrencies which constitute at least some percentile of daily trade volume.

The system may determine the isolated value of a security or securities index simply by taking the total value of the security or securities index in USD. The value of a set of securities or securities indices can be averaged or added together. The set may include: the top most heavily traded securities, the most valuable securities, or indices selected by an administrator.

The internal exchange value of a standard circulation data parcel may be set equal to the set of fiat currencies, the set of securities, the set of commodities, and the set of cryptocurrencies added together, with each multiplied by a -corrector- to enable an administrator to calculate the relative importance of each set. In variations, there may be more than one standard circulation data type, with each type utilizing different correctors, or different value calculations for each set when calculating the internal exchange value.

Thus, while the external exchange value parameter is in a form in which the referenced asset is usually exchanged, such as USD, the internal exchange value is in a form which incorporates the standard circulation data parcel as the unit of measurement.

In one embodiment, the account systems comprise both external accounts and internal accounts, with the external accounts constituting the various accounts connected with the account systems but which are managed by external platforms or systems other than SAS, and the internal accounts constituting accounts managed at least in part by SAS, though both the external accounts and internal accounts within an account system would be managed, controlled, and owned by the same individual, entity, or party. Thus, the individual, entity, or party would access their internal accounts through the presently described platform and would access their external accounts through external platforms. External platforms may include banking, brokerage, or other investment or asset/currency transfer platforms.

Formulae may include calculations involving the internal exchange values of other circulation data types, the total quantity of all circulation data parcels of a given type, the external exchange value of some asset referenced by an asset data parcel, and so on. For example, circulation data type two may have an internal exchange value equal to the internal exchange value of circulation data type one, times the external exchange value of an ounce of gold, divided by the total quantity of all circulation data type two.

The value parameter of a circulation data parcel may be initially set to the external exchange value 482 and the internal exchange value parameter may be set to the value parameter 484. If a change in the external exchange value is detected by the system based on updated monetary asset data and the security parameter is set to FALSE 486a, then the value is set to the new external exchange value 481 and the internal exchange value is set to the value 484. However, if the security parameter is changed from FALSE to TRUE 486b, then even if a change in the external exchange value is detected by the system 488b or the value parameter changes, the internal exchange value will not change 490.

Figure 4E:
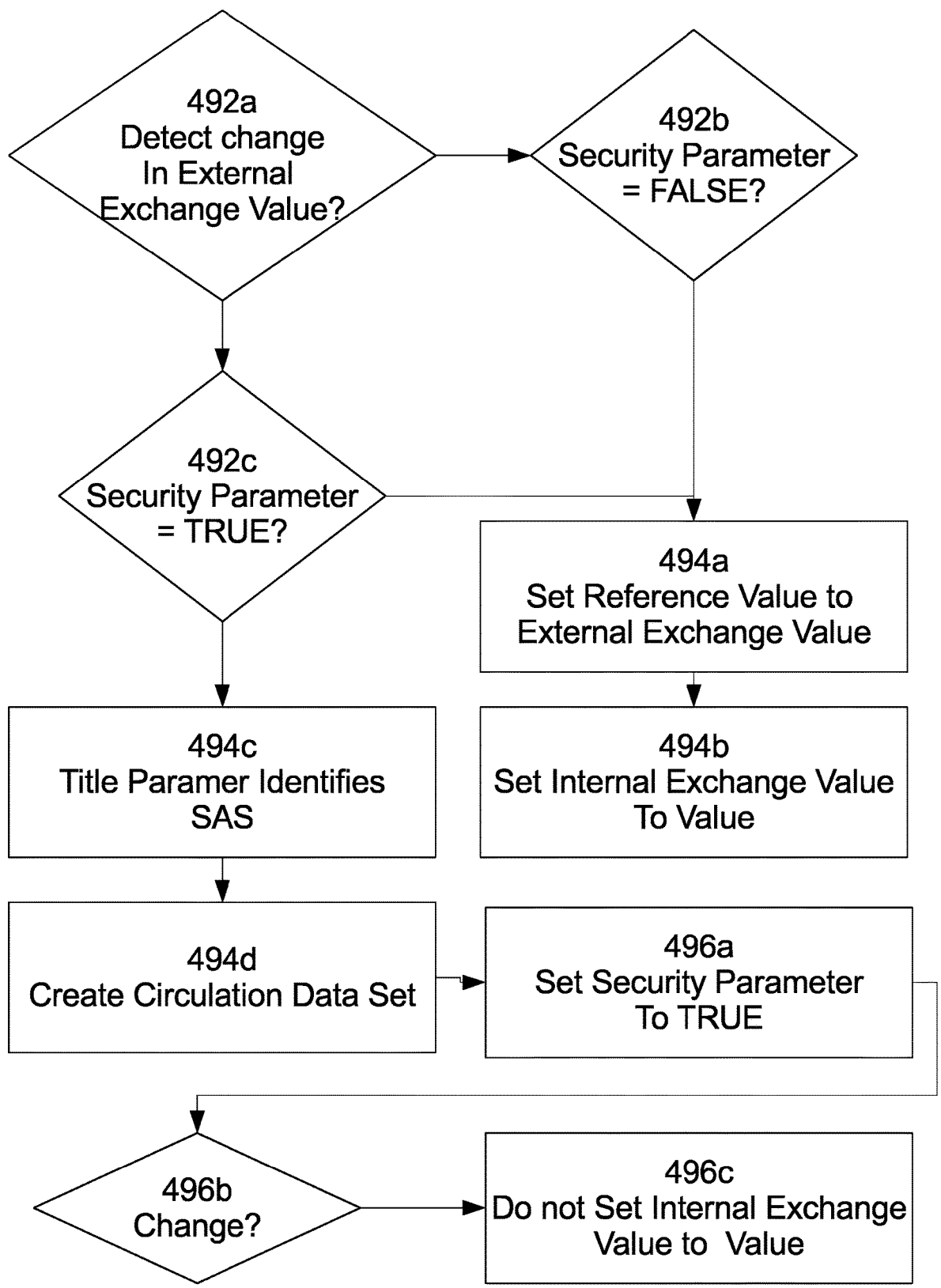
FIG. 4e is a flowchart showing an exemplary circulation data parcel securitization method in which control over a first circulation data parcel is given to SAS and a second circulation data parcel is created for the account system.

In one variation, as shown in FIG. 4e, if a change is the external exchange value of a circulation data parcel is detected by the system based on updated monetary asset data 492a and the security parameter is set to FALSE 492b, then the value is set to the new external exchange value 494a and the internal exchange value is set to the value 494b. However, if the security parameter is changed from FALSE to TRUE 492c, then if a change in the external exchange value is detected by the system 492a and the value parameter changes 494a, the internal exchange value will be set to the value 494b, the title parameter will change to identify SAS 494c, a new circulation data parcel will be created 494d identical to the original circulation data parcel including the original title parameter, except that the security parameter is set to TRUE 496a and the internal exchange value will not be changed 496c even if the value or and external exchange value change 496b.

Figure 5A:
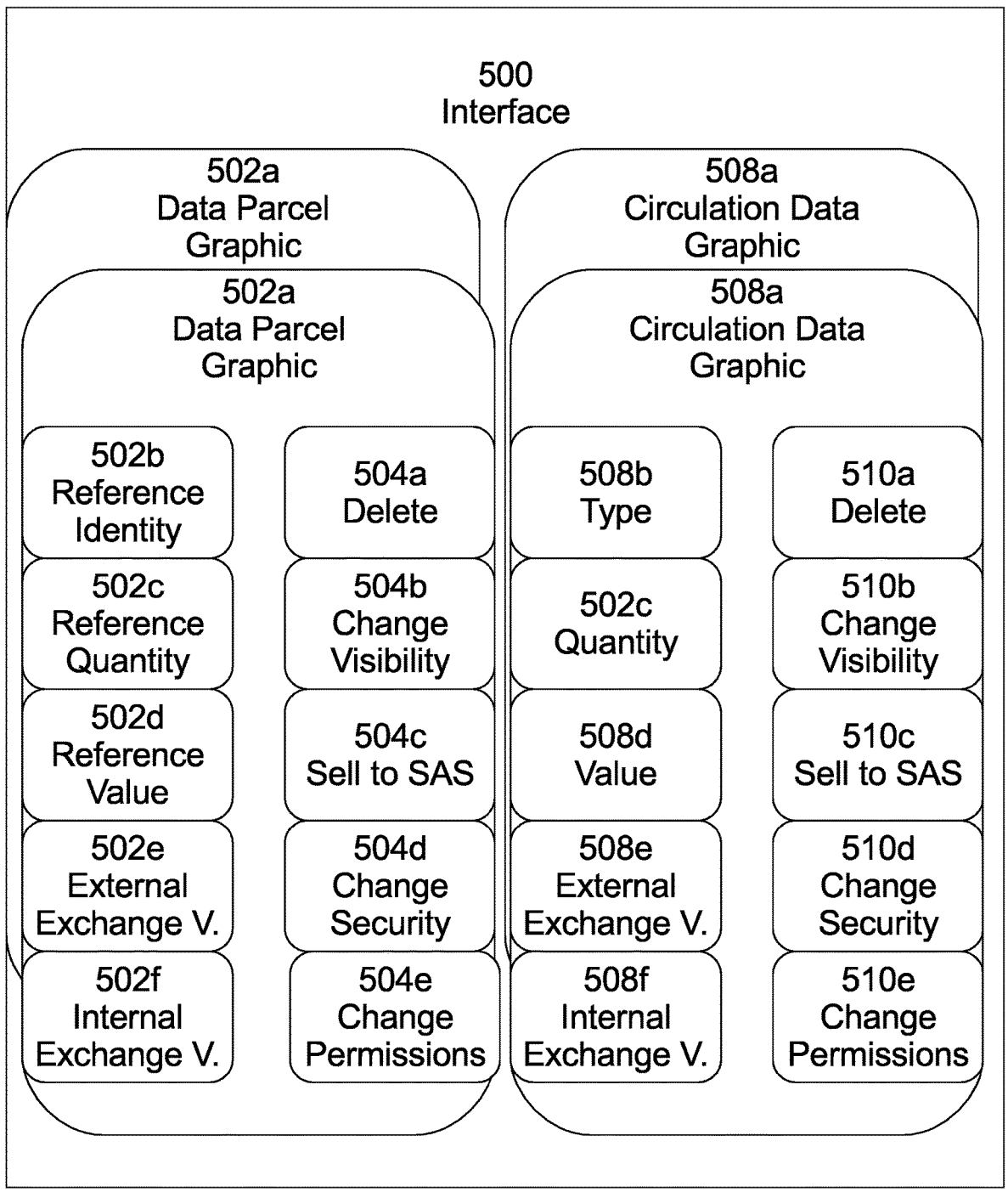
FIG. 5a shows an exemplary account system interface.

As shown in FIG. 5a, the platform may provide an interface 500 to display all of the asset data parcels having title parameters identifying a given account system. This display is distinct from the public register in that only the asset data parcels having title parameters identifying a given account system are displayed and the interface on which the display occurs is only accessible via the identified account system. The interface may display a graphical representation of each asset data parcel 502a, the reference identity 502b, reference quantity 502c, reference value 502d, the external exchange value 502e, the internal exchange value parameters 502f, as well as a set of actions under the control of the account system, such as deleting the asset data parcel 504a, changing the visibility parameter 504b, exchange (e.g., sell) the asset data parcel or a sub-quantity thereof to the SAS 504c, or changing the security parameter 504d. Similarly, the interface may display all the circulation data parcels having title parameters identifying the given account system, including a graphical representation of the circulation data parcels 508a, the circulation data type 508b, quantity 508c, value 508d, the external exchange value 508e, the internal exchange value parameters 508f, as well as a set of actions under the control of the account system, such as deleting the circulation data parcel 510a, changing the visibility parameter 510b, sell the circulation data parcel or a sub-quantity thereof to the SAS 510c, or changing the security parameter 510d. For the asset data parcels and the circulation data parcels, passive permission settings can also be accessed via graphics 504e, 510e. If the account system is identified by the title parameters of multiple types of circulation data, then each type with its corresponding quantity parameter will be graphically represented. The Data Parcel and Circulation Data graphics may be displayed all at once, in a stacked pile, or in a plurality of stacked piles. The Interface may be displayed on a display device connected to or integrated into a computing device or smart device.

Figure 5B:
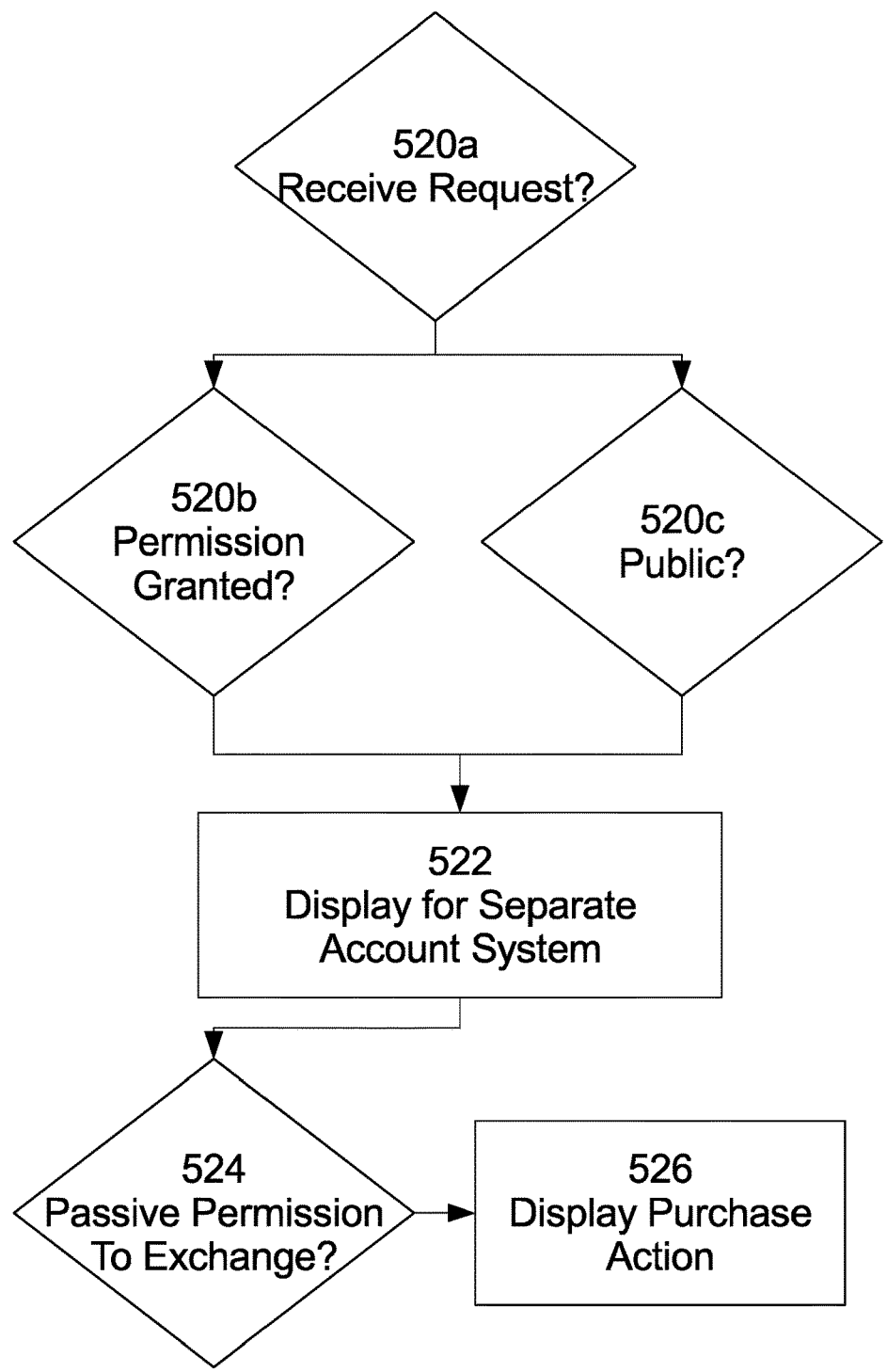
FIG. 5b is a flowchart showing an exemplary asset data parcel and circulation data parcel display method.

Generally, the interface displaying the asset data parcels and the circulation data parcels is only displayed on the set of computers authorized to access the given account system, but as shown in FIG. 5*b*, upon receiving a request from a (separate) accessing account system 520*a* and permission from the given account system 520*b*, or in lieu of permission, an detection of a public parameter 520*c*, the interface may display the asset data parcels and/or the circulation data parcels on a set of computers authorized to access the accessing account system 522. However, the display of asset data parcels or circulation data parcels for the accessing account system may feature different actions. If the system determines that the asset data parcel or circulation data parcel can be exchanged with the accessing account system 524 based on Passive Permission settings, a purchase action may be enabled (and displayed) 526. Permission may be limited to the communication or display of thresholds relating to the asset data parcels and the circulation data parcels, such as whether quantity parameters exceed a particular number.

In one embodiment, circulation data parameters for a given account system is determined by data from an external bank account coupled to the given account system and asset data parcels parameters are determined by data from an external brokerage account coupled to the given account system. Data parcels parameters may also be determined based on deeds or titles, such as real property title documents uploaded to the account system. Documents may also provide additional information relating to the portion of equity in, for example, real estate, and what portion is still owned by the bank via a mortgage. The asset data parcel parameters may be updated based on a reoccurring schedule, such as monthly. The updates may occur based on predictions of when events relating to the assets occur, such as if there is a history of monthly mortgage payments for the same amount each month. Verification of the updates may occur according to a different periodicy, such as bi-annually. The Documentation may be physically scanned or otherwise transmitted to the system.

In one version, the reference quantity parameters for asset data parcels, whether determined by real property title documents or external brokerage accounts, must be positive rational numbers, because it is possible for an individual to own merely a fraction of an asset but not possible to own a negative fraction of an asset. In another version, the quantity parameters for circulation data parcels may also be negative rational numbers because it is possible and even common for individuals to be in financial debt. Quantity parameters can never be irrational numbers.

The system may create loan documentation for users to sign, with the assets serving as collateral for the loan, and the loan constituting, at least in part, circulation data parcels and/or asset data parcels.

In one embodiment, asset data parcels and circulation data parcels may both be supported using blockchain technology. Thus, changes to each asset data parcel and circulation data parcel may be recorded in a ledger forming at least part a ledger parameter of each asset data parcel and circulation data parcel. Thus, SAS is unable to make changes to asset data parcels or circulation data parcels without those changes appearing in the asset data parcels and circulation data sets themselves.

Figure 6:
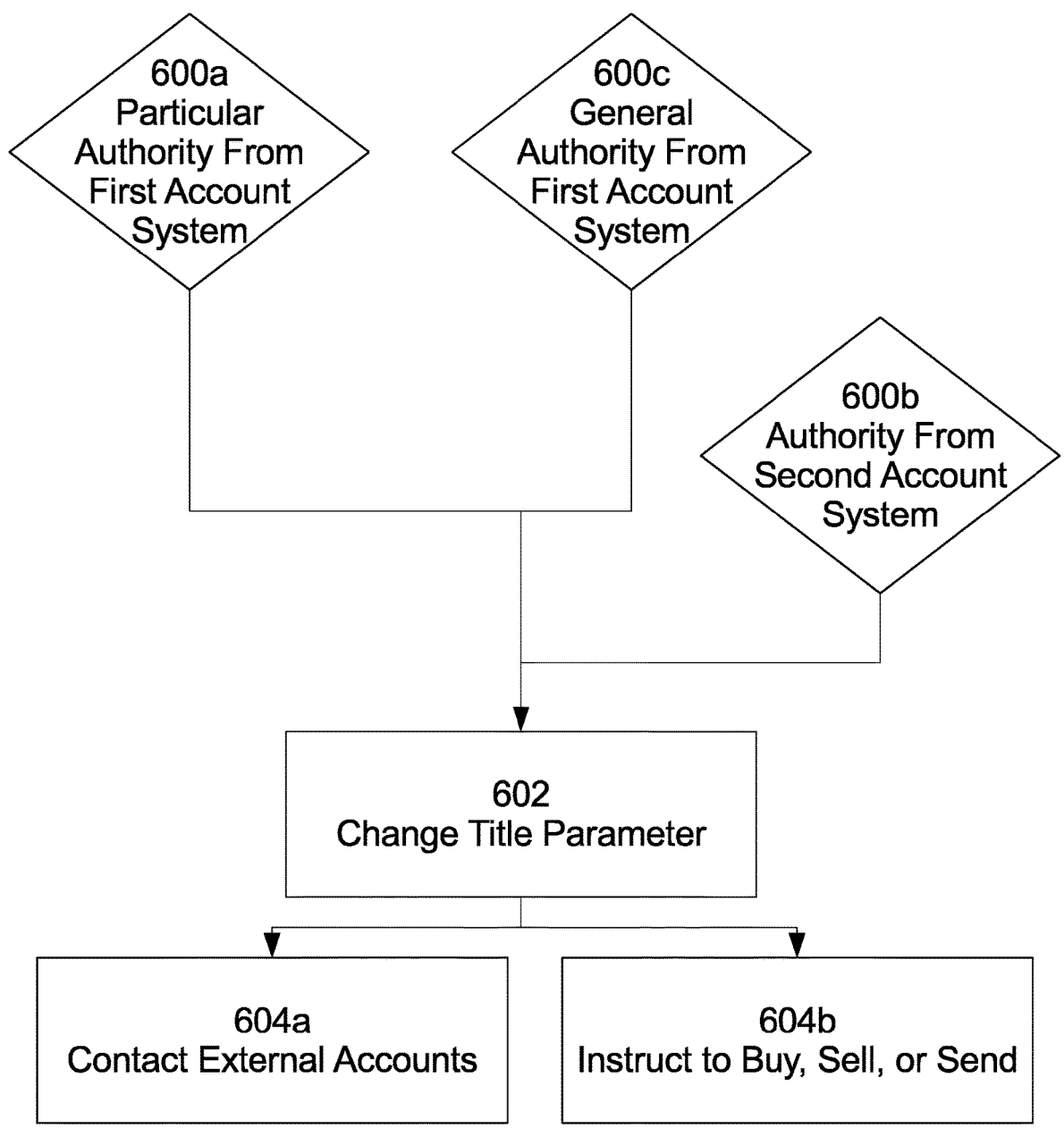
FIG. 6 is a flowchart showing an exemplary exchange method.

As shown in FIG. 6*a*, upon receiving authority from a first account system 600*a*, the system may change the title parameter for a first asset data parcel or a first circulation data parcel from the first account system to the second account system 602. Authority from the first account system for a change in the title parameter of the first asset data parcel or the first circulation data parcel may be incumbent on receiving permission from the second account system 600*b* to change the title parameter of either a second asset data parcel or a second circulation data parcel from the second account system to the first account system; thus, both account systems must authorize or permit title parameter changes to the asset data parcels and/or circulation data parcels from identifying themselves to identifying the other account system. This is considered an exchange by the system. Authority is active in that it is a request or command from an account system to change a parameter of an asset data parcel or a circulation data parcel controlled by another account system, whereas permission is passive in that it acquiesces with respect to a parameter change over which it has control. However, both active authority and passive permission may be set based on the application of rules upon the detection of events, and therefore, from hereon, unless otherwise noted, both authority and permission will be referred to as, uniformly, authority. The asset data parcel or circulation data parcel for which a parameter change is authorized will be referred to as the "target".

Passive permission limitations available to any given account system may include automatic rejection of requests to exchange asset data parcels or circulation data parcels controlled by the account system for asset data parcels or circulation data parcels with security parameters set to FALSE, or security parameters set to TRUE, or circulation data of a type pegged to a particular currency such as USD or Bitcoin, or asset data parcels with reference identity parameters corresponding to certain commodities such as gold or to certain stocks such as oil companies. In this way, a given account system may operate as a technical exchange boycott of the objects of those limitations. Passive permission limitations may also be imposed on asset data parcels or circulation data parcels it controls, such that requests made by other account systems to exchange for those asset data parcels or circulation data parcels, not matter what the offer includes, is automatically rejected. In this way, an account system may maintain control over a given asset data parcel or circulation data parcel without having to actively reject offers of exchange.

Passive permission limitations may also be imposed on asset data parcels or circulation data parcels with respect to a particular quantity, such that permission is given for asset data parcels with a particular reference identity parameter or circulation data of a particular type until a set threshold quantity is reached, and afterward it is denied. Quantity based passive permission limitations may also be applied to the exchange of asset data parcels or circulation data parcels controlled by the account system, such that permission is given for their exchange until a minimum quantity remains under the account system's control. In this way, account systems may ensure that they maintain a sufficient quantity of particular asset data parcels or circulation data parcels, or are exposed to an acceptable quantity of the same.

Title change authority with respect to asset data parcels or circulation data parcels referencing a given account system may be communicated to the system by a user in control of the given account system via the account system interface.

Returning to FIG. 6, the authority 600*a* described here may be particular, with the target of a title parameter change being an actual, particular asset data parcel, or general, with the target being any sufficient asset data 600*c* parcel and/or circulation data parcel and/or combination thereof, with sufficiency being determined by the internal exchange value parameters and quantity parameters of the asset data parcels and/or circulation data parcels. For example, sufficiency for a first account system asset data parcel vis-a-vis a second account system asset data parcel exists if the first account system asset data parcel's internal exchange value parameter times its quantity parameter is equal to or greater than the internal exchange value times the quantity parameter of the second account system asset data parcel. Authority may also be specified to a portion of a particular asset data parcel, such that a quantity less than the quantity parameter is specified for title parameter change, in which case the target will be divided into portions or subsets. For title change, either or both the first and second account systems must give particular authority as it would be incoherent for both to give merely general authority.

Particular authority with respect to a target may be communicated by the user selecting via the interface the asset data parcel or circulation data parcel having the title parameter the user desires to change. General authority may be communicated implicitly if particular authority is communicated only in respect to an asset data parcel or circulation data parcel identifying one account system but not in respect to an asset data parcel or circulation data parcel identifying the other account system.

In one embodiment, if the authority is particular with respect to both the first and second asset data parcels but the internal exchange value of the first asset data parcel is more than the second asset data parcel, then the system may divide the first asset data parcel ($P_F$) into asset data parcel portions ($P_{F1}$ and $P_{F2}$), such that each of the asset data parcel portions have reference quantities being complimentary fractions of the original reference quantity ($Q_F$), such that one asset data parcel portion reference quantity ($Q_{F1}$) is the original reference quantity minus the other asset data parcel portion reference quantity ($Q_{F2}$). Thus, $Q_{F1}=Q_F-Q_{F2}$, or $Q_{F1}+Q_{F2}=Q_F$. The division of $P_F$ into $P_{F1}$ and $P_{F2}$ should be such that the internal exchange value of the first asset data parcel ($V_F$) times the reference quantity of the one asset data parcel portion ($R_{F1}$) is equal to the internal exchange value of the second asset data parcel or circulation data parcel ($V_S$). Thus, $(V_F)^*(Q_{F1})=V_S$, assuming the reference quantity parameter of the second asset data parcel is singular; otherwise, $(V_F)^*(Q_{F1})=(V_S)(Q_S)$, with $Q_S$ being the quantity parameter of the second asset data parcel. The system will change the title parameter of the first asset data parcel portion but retain the original asset data parcel title parameter for the second asset data parcel portion. Thus, a portion of the first asset data parcel is exchanged for the second asset data parcel.

In another embodiment, if the authority is particular with respect to both the first and second asset data parcel but the internal exchange value of the first asset data parcel is more than the second asset data parcel, then the second circulation data parcel will be divided into a first and second subset of the second circulation data parcel, such that $(V_F)^*(R_F)=(V_S)(Q_S)+(V_{SC})(Q_{SC1})$, with $V_{SC}$ being the internal exchange value of the second circulation data parcel and $Q_{SC1}$ being the quantity parameter of the first subset of the second circulation data parcel. The system will change the title parameters of the first asset data parcel, the second asset data parcel, and the first subset of the second circulation data parcel. Thus, the first asset data parcel is exchanged for the second asset data parcel in addition to a subset of the second circulation data parcel.

In one variation, if a. the second account system is identified by the title parameter of the second circulation data parcel as well as a third circulation data parcel, b. the second and third sets of circulation data are of different types, and c. the internal exchange value of the first asset data parcel is more than the second asset data parcel and the second circulation data parcel, then the third circulation data parcel will be divided into a first and second subset of the third circulation data parcel, such that $(V_F)^*(R_F)=(V_S)(Q_S)+(V_{SC})(Q_{SC})+(V_{TC})(Q_{TCB1})$, with $V_{SC}$ being the internal exchange value of the second circulation data parcel, $Q_{SC}$ being the quantity parameter of the second circulation data parcel, $V_TC$ being the internal exchange value of the third circulation data parcel, and $Q_{TC1}$ being the quantity parameter of a first subset of the third circulation data parcel. Thus, the first asset data parcel is exchanged for the second asset data parcel in addition to two types of circulation data—all of the second set, and a subset of the third set.

In one embodiment, if authority is particular only with respect to the second asset data parcel and the internal exchange value of the first circulation data parcel exceeds the internal exchange value of the second asset data parcel, the system will first perform the division step with the first circulation data parcel and change the title parameters of a first subset of the first circulation data parcel and the second asset data parcel. Thus, the first circulation data parcel is exchanged for the second asset data parcel. But if the internal exchange value of the first circulation data parcel does not exceed the internal exchange value of the second asset data parcel, then the system shall perform a division step with the first asset data parcel and change the title parameters of the first circulation data parcel, a first portion of the first asset data parcel, and the second asset data parcel. Thus, the first circulation data parcel is insufficient to be exchanged for the second asset data parcel.

In another embodiment, if authority is not only particular with respect to both the first and second asset data parcel but also specified with respect to a reference quantity of a first asset data parcel portion, and the reference quantity of the first asset data parcel portion times the internal exchange value of the first parcel portion is less than the reference quantity times the internal exchange value of the second parcel portion, then the system will divide the second asset data parcel such that $(V_F)^*(Q_{F1})=(V_S)(Q_{S1})$. Thus, a specified portion of the first asset data parcel is exchanged for a calculated portion of the second asset data parcel. However, if $(V_F)^*(Q_{F1})>=(V_S)(Q_S)$, then the system may compute an error which may be displayed on the interface. Similarly, if authority is particular with respect to both the first and second asset data parcel but also specified with respect to a reference quantity of a second asset data parcel portion, and the reference quantity of the second asset data parcel portion times the internal exchange value of the second parcel portion is less than the reference quantity times the internal exchange value of the first parcel, then the system will divide the first asset data parcel also such that $(V_S)^*(QSi)=(V_F)(Q_{F1})$. If $(V_S)^*(Q_{S1})>=(V_F)(Q_F)$, then the system may compute an error which may be displayed on the interface.

In one embodiment, the interface displays to the user(s) of the account system the internal exchange value equivalence between some asset data parcels and/or circulation data parcels. More precisely, the interface may display the quantity and internal exchange value parameters on one side of the exchange and the quantity and internal exchange value parameters on the other side of the exchange, with the parameters on one side changing in real-time as the user changes particular authority with respect to the quantity parameter on the other side of the exchange.

After title parameter change activities occur between account systems 602, the system may transmit data to the external accounts coupled to the account systems 604a, such as external bank and brokerage accounts, using the login credentials saved to the account systems. This transmitted data may correspond to instructions 604*b* to the external bank or brokerage accounts to buy, sell, or send assets to the external bank or brokerage accounts coupled to other account systems, including the bank or brokerage accounts coupled to the SAS.

The system may similarly transmit data to the external accounts coupled to the account systems in response to receiving instructions to change the security parameters of one or more asset data parcels to TRUE. In this case, the system is essentially selling the asset referenced by an original asset data parcel via the account system's external brokerage account and buying it via the brokerage account coupled to the SAS.

The system may close an account system if it determines that the data obtained from the external accounts is fraudulent, or that the asset data parcels or sets of circulation data parcels are affiliated with criminal activity. The closure of an account system may result in a system deletion of the account system. In one variation, if an account system is deleted, the asset data parcels and sets of circulation data parcels controlled by that account system will be deleted. In another variation, the title parameters will be changed from the account system to SAS.

A system may also close an account system if it receives a request from the account system itself. This request may be initiated directly by a user of the account system or programmed as an outcome based on a condition precedent. In one variation, closure of an account system may result in a deletion of all asset data parcels and circulation data parcels controlled by the user. In another variation, the asset data parcels and circulation data parcels are simply frozen—i.e., their parameters cannot be changed, all requests to change the parameters are rejected, etc.

The system may receive data from the external accounts coupled to the account systems, and automatically update the various parameters of asset data parcels or circulation data parcels in response to that received data. The system may also update the parameters in response to data it receives from the brokerage account coupled to the SAS. Such updates may include external exchange value parameters, which could be based on external exchange rates of the referenced assets vis-a-vis other assets, such as stocks, bonds, cryptocurrencies, or government-issued currency.

Account systems may be coupled to unique portals or interfaces based on account system type. Account system types may include a professional seller account system, a casual seller account system, a buyer account system, and an investor account system. Account system types may also consist of hybrids, such as an account system with portals and interfaces adapted to both the buyer account system and the investor account system. The account systems may differ based on their default settings such as whether the security parameter of asset data parcels is set to TRUE or FALSE, whether the account system has permission to change the security parameter of its asset data parcels, or whether the account system may be coupled to certain external accounts. Another difference may include the kinds of interactions with other account system a given account system may engage in. For example, certain account systems may only be able to interact with SAS but not other account systems.

In one embodiment, the platform provides software tools for the user creation of data parcels. These tools may include a specific data parcel creation module, featuring a set of field entries connected to a database. Users can set any of the various data parcel parameters, the platform can determine a first set of parameters based on a second set of parameters, and/or the platform can determine parameters based on the detection, analysis, and processing of data parcel predicates, such as evidentiary documentation or data files.

In one embodiment, a user creates, via the data parcel creation module, a set of data parcels; further, the user may set an initial internal exchange value of the newly created data parcels. The user-created data parcels may each be associated with portions of a data article, with the full set of data parcels corresponding fully with the entirety of the data article, and therefore such user-created data parcels may be referred to as quantum data parcels, because a quantum is a unit in a set of units that may make up a whole. In one variation, the entirety of a dimension of control may be invested in the set of data parcels, with the dimension of control pertaining to a set of permissions associated with the data article. In one variation, the data article corresponds to an asset, including a tentatively future external asset, and as such, identifies various properties of the tentatively future external asset, such as the type of the external asset, the location of the external asset, the rights and obligations pertaining to the external asset, etc. The asset may be a real or digital project or order of products or services, and the data article may encompass the associated details thereof, including dates, quantities, measurements, prices, durations, materials. etc. Specifically, the data article may operate as a functional data representation of an external asset, with changes, modifications, or status updates of the data article intended to be applied to the external asset. Thus, the quantum data parcels may provide control over an external asset via the data article, including an external asset that has not yet been created or completed. In one variation, the data article is a program or application which exhibits control over the external asset via data transfer and modification. In one variation, the quantum data parcels are programs or applications which exhibit control over the data article via data transfer and modification.

The user creator, or account responsible for the creation of the quantum data parcels may be referred to as the "controller". When all of the quantum data parcels associated with the data article are exchanged by the controller with other users ("receivers"), then the data article may designate a specific established external asset, with designation of the established external asset signifying that the receivers now have control over the established external asset via their quantum data parcels. Prior to designation of the established external asset, the receivers have no control over the established external asset via the quantum data parcels. In one version, the designation occurs at a pre-determined time after the last quantum data parcel in the set of quantum data parcels (i.e., the quantum set) is exchanged. In another version, the designation occurs at a pre-determined and previously-disclosed date in order to inform receivers as to the time remaining to receive the quantum data parcels prior to designation. In yet another version, the designation occurs when the controller implements the designation via the data parcel creation module, thereby giving full control of the time of designation to the controller. The period prior to designation may be referred to as the "pre-designation stage" and the period subsequent to designation may be referred to as the "post-designation stage".

The quantum data parcels may be exchanged between the controller and the receivers for circulation data parcels or asset data parcels controlled by the receivers. The period prior to an exchange of all quantum data parcels with receivers may be referred to as the "incomplete exchange stage" and the period after the exchange of all quantum data parcels may be referred to as the "complete exchange stage".

A set of quantum data parcels which have been fully exchanged with receivers may be referred to as being "completely exchanged".

In one embodiment, the quantum data parcels within a quantum set have gradated initial internal exchange values, such that quantum data parcels obtained from the controller by receivers at an earlier date have a lower initial internal exchange value than quantum data parcels obtained from the controller by receivers at a later date. In one variation, at the end of the pre-designation stage and the beginning of the post-designation stage, or in a second variation, at the end of the incomplete exchange stage and the beginning of the complete exchange stage, the internal exchange values are reset (or a new parameter, "reset internal exchange values" are created) so that the sum of the reset internal exchange values are equal to the external exchange value of the established external asset. In one variation, the reset of the internal exchange values obtain equality, such that if the established external asset has an estimated value of 1 unit and there are ten quantum data parcels, then each quantum data parcel, regardless of its initial internal exchange value, will have a reset internal exchange value of 0.1 units. However, the quantum data parcels obtained earliest may have initial internal exchange values that are far less than the reset internal exchange value, while the quantum data parcels obtained later may have an initial internal exchange value only slightly less than the reset internal exchange value. In this way, it is more advantageous for a receiver to exchange for the quantum data parcels as early as possible.

In one variation, the gradation of the initial internal exchange values occurs across a set time-span, rather than sequentially as quantum data parcels are exchanged. In this variation, the initial internal exchange values of the quantum data parcels are at their lowest as soon as the quantum set is available for exchange, and then increase with time.

In one variation, the sum of the gradated initial internal exchange values is less than the estimated value of the established external asset, so even the last quantum data parcel exchanged will increase in its internal exchange value once the data article designates the new external asset.

In one version, the controller designates a date or duration ("duration date") for the quantum data parcels. In one variation of this version, if the date or duration expires before all quantum data parcels within a quantum set are exchanged, then the quantum data parcels obtained by the receivers are automatically re-exchanged with (i.e., returned to) the controller based on their initial internal exchange value. In another variation of this version, if the data or duration expires before all quantum data parcels are exchanged, then the quantum data parcels obtained by the receivers are removed from the system. In yet another variation of this version, if the data or duration expires before all quantum data parcels are exchanged, then the quantum data parcels obtained by the receivers are automatically re-exchanged with the controller based on the initial internal exchange value multiplied by some first factor and/or added to or subtracted by some second factor, with the first and second factor being between 0 and 1, 1, or greater than 1.

In one version, the initial internal exchange value of an already exchanged quantum data parcel may be set to automatically increase as additional quantum data parcels are exchanged, thereby forming trending internal exchange values. In this version, the quantum data parcels not only may increase in internal exchange value once the internal exchange value is reset (i.e., at the end of the pre-designation or incomplete exchange stage), but also as the remaining quantum data parcels are exchanged (i.e., during the incomplete exchange stage). In one variation, the increase in internal exchange value is tracked such that when the initial internal exchange values are reset as described above, the amount or percentile by which the trending internal exchange value has increased over the initial internal exchange value is applied to the reset internal exchange value, so that when the data article designates the established external asset, the earlier quantum data parcels were not only exchanged for less than the later exchanged quantum data parcels, but they will also have higher internal exchange values.

In one version, in order for the quantum data parcels to be made available for exchange, the system must verify predicates of the tentatively future external asset. The predicates should designate how the tentatively future external asset becomes an established external asset. These predicates may amount to contracts or other documents evincing the potential reality (i.e., the possibility of being established) of the tentatively future external asset. In one variation, these predicates are made available to users of the system to examine before exchanging for the quantum data parcels.

Once the data article designates an established external asset, the quantum data parcels may cease to be treated as quantum data parcels, and may be treated like regular data parcels by the system. Thus, the quantum data parcels may be exchanged for other data parcels or circulation data according to their reset internal exchange values. Accordingly, the reset internal exchange values are treated simply as internal exchange values.

In one embodiment, the quantum data parcels may have a so-called "advantageous internal exchange value" in addition to a "regular" internal exchange value. The advantageous internal exchange value may apply to other data parcels offered by the controller or any affiliated accounts, such that the advantageous internal exchange value is higher than the regular internal exchange value of the quantum data parcels vis-a-vis the other data parcels. The quantum data parcels may be exchanged by the receivers with the other data parcels of the controller at a rate that favors the receivers. Yet the advantageous internal exchange value may not apply to data parcels offered for distribution by users or accounts other than the controller or affiliated accounts, and thus the advantageous internal exchange value only has significance during exchanges between the controller or its affiliate accounts and receivers—although if a receiver were to exchange its quantum data parcel with a third user, that third user would retain the same benefit of the advantageous internal exchange value of the quantum data parcel vis-a-vis the controller or its affiliate accounts. In one version, the advantageous internal exchange value may be set by the controller.

In one embodiment, the advantageous internal exchange value is inversely related to the initial internal exchange value such that as subsequent quantum data parcels are exchanged between the controller and receivers, the initial internal exchange value increases and the advantageous internal exchange value decreases (although it does not decrease below the initial or reset internal exchange value). In this embodiment, the advantageous internal exchange value is less advantageous for each subsequent quantum data parcel exchanged during the incomplete exchange stage. In one version, the delta/difference between the initial internal exchange value and the reset internal exchange value is equal to the delta between the reset internal exchange value and the advantageous internal exchange value. In another version, the former and latter deltas described above are not equal.

In one variation, the controller may offer subsequent sets of quantum data parcels for exchange, typically during the complete exchange stage or post-designation stage. If a receiver has already received in exchange a quantum data parcel of a given initial internal exchange value, the receiver may exchange for additional quantum data parcels matching that initial internal exchange value while maintaining the advantageous internal exchange value. In another variation, the receiver may exchange for additional quantum data parcels matching the advantageous internal exchange value as the previous quantum data parcels.

In one variation, the quantum data parcels may only be exchanged with the controller. In this variation, the delta between the initial internal exchange value and the advantageous internal exchange value maintains significance because the receivers may receive the quantum data parcel based on the initial internal exchange value, but exchange the quantum data parcel with the controller or its affiliate accounts based on the advantageous internal exchange value.

In one variation, when the quantum data parcel is set to "unsecure", the initial, reset, and advantageous internal exchange values may be adjusted based on changes to the external exchange value.

Figure 7:
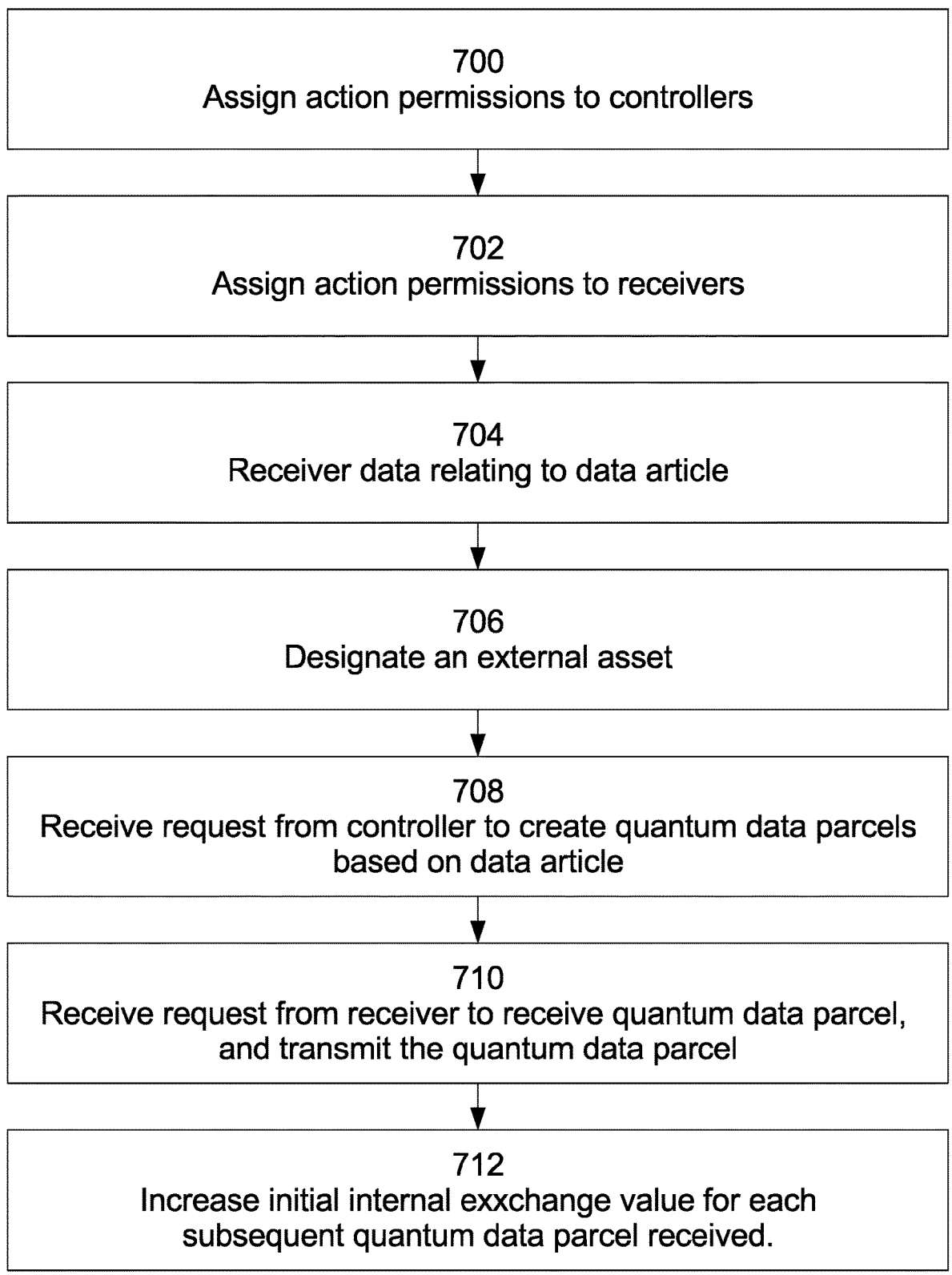
FIG. 7 is a flowchart showing an exemplary quantum data parcel creation and receipt method.

As shown in FIG. 7, the system may assign action permissions to controllers 700 pertaining to the creation of data articles and quantum data parcels and action permissions to receivers 702 pertaining to receiving the quantum data parcels. The system may then receive from the controller data relating to a data article 704, designate an external asset 706, receive a request from a controller to create quantum data parcels based on the data article 708, receive a request from a receiver to receive a quantum data parcel and transmit the quantum data parcel to the receiver 710, and increase the initial internal exchange value for each subsequent quantum data parcel received within the set of quantum data parcels 712.

Figure 8:
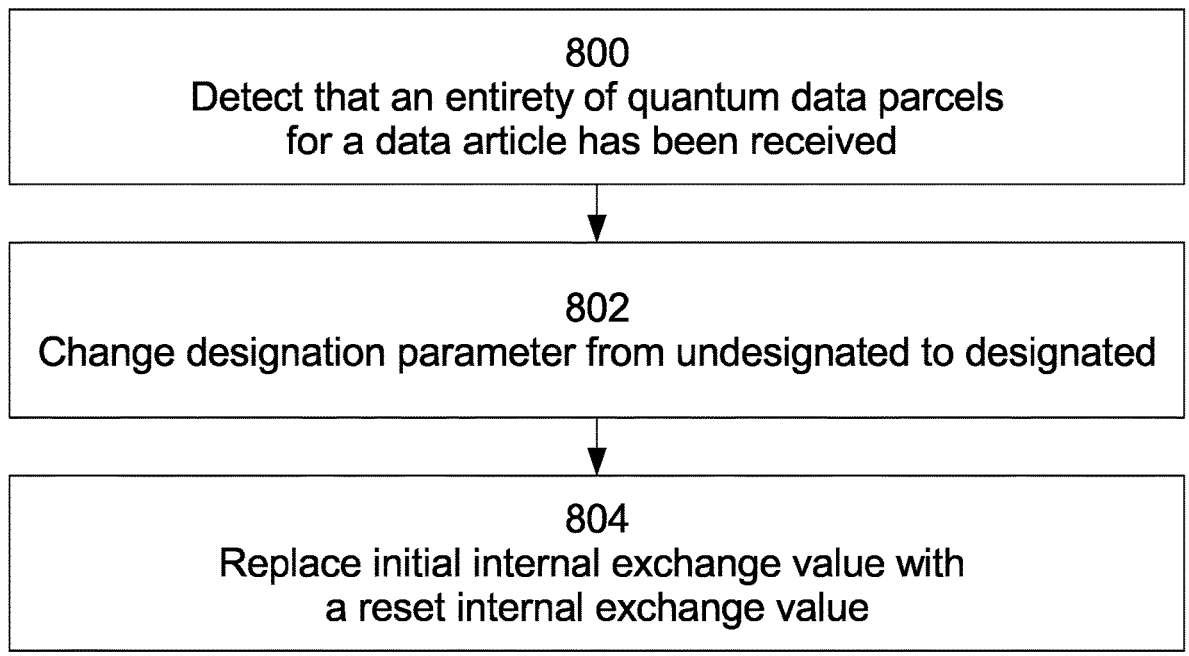
FIG. 8 is a flowchart showing an exemplary quantum data parcel return method.

As shown in FIG. 8, the system may, upon detecting that the entirety of quantum data parcels pertaining to a data article have been received 800, or that a pre-determined date has been reached, change the designation parameter of the data article from undesignated to designated 802, and replace the replace the initial internal exchange value with a reset internal exchange value 804.

Figure 9:
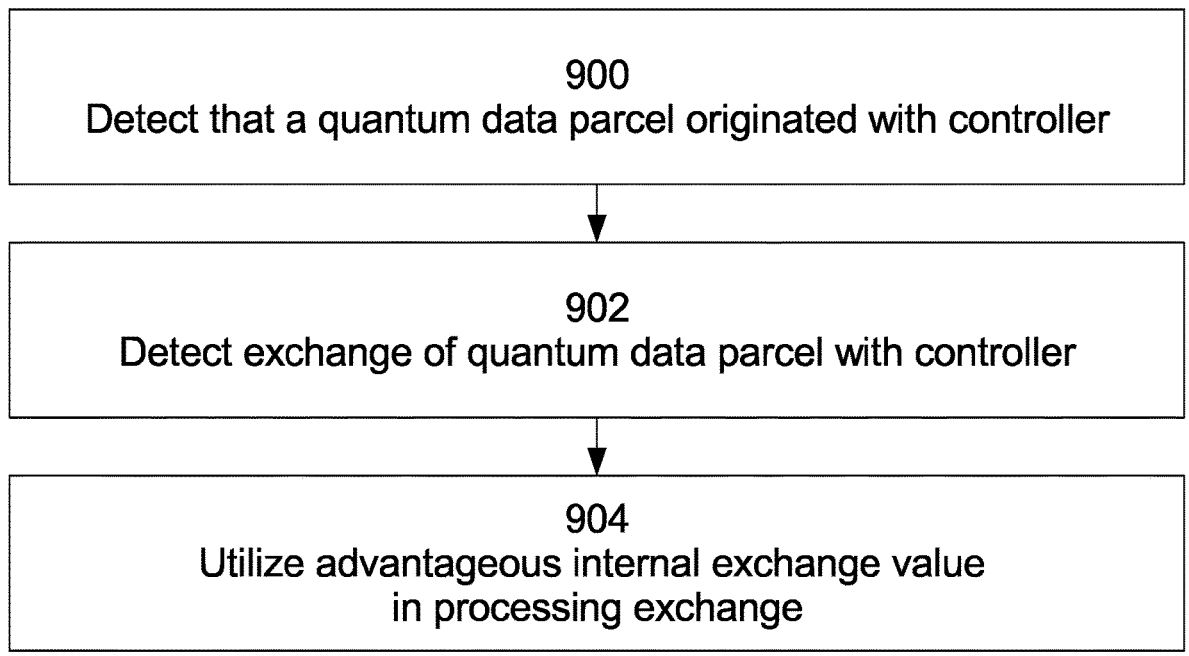
FIG. 9 is a flowchart showing an exemplary advantageous internal exchange value utilization method.

As shown in FIG. 9, if the system detects that a given quantum data parcel originated with a given controller 900 and that a receiver is attempting to exchange the given quantum data parcel previously received from the given controller with the given controller 902, then set utilize the advantageous internal exchange value in processing the exchange 904.

The invention claimed is:

1. A designation and quantumization exchange system comprising a set of internal accounts and a set of computers connected over a network, wherein the set of computers are programmed to:
   a. assign action permissions to a controller and action permissions to receivers, wherein the action permissions assigned to the controller include permission to create data articles and quantum data parcels and action permissions assigned to receivers including permission to receive quantum data parcels from the controller;
   b. receive data relating to a data article:
      i. wherein the data article is configured to designate an external asset, with the external asset being external to the system;
      ii. wherein the data article comprises a first reference identity parameter, wherein the first reference identity parameter identifies the external asset;
      iii. wherein the data article comprises a designation parameter, wherein the designation parameter is configured to change between 'undesignated' and 'designated', wherein a designated value pertaining to the external asset is identified by the first reference identity parameter;
   c. receive a request from the controller to create a set of quantum data parcels using data relating to the data article, wherein each quantum data parcel in the set of quantum data parcels comprises:
      i. a second reference identity parameter, wherein the second reference identity parameter identifies the data article,
      ii. an internal exchange value parameter, wherein the internal exchange value parameter initially identifies an initial internal exchange value of the quantum data parcel internal to the system, wherein the initial internal exchange value identifies the quantity and type of other data parcels or circulation data for which the given quantum data parcel may be exchanged;
   d. change the designation parameter of the data article from 'undesignated' to 'designated' upon detecting a satisfaction event.

2. The system of claim 1, with the satisfaction event being either an entirety of the set of quantum data parcels having been received or a pre-determined date having been reached.

3. The system of claim 1, wherein the set of computers are additionally programmed to: upon determining that the designation parameter of the data article has been changed from 'undesignated' to 'designated':
   a. replace the initial internal exchange value with a reset internal exchange value, with the reset internal exchange value being higher than the initial internal exchange value.

4. The system of claim 1, wherein the set of computers are additionally programmed to:
   a. if not all of the quantum data parcels were received by a pre-determined date:
      i. return to the controller quantum data parcels previously received by the receivers, and
      ii. return to the receivers at least a portion of the other data parcels or circulation data exchanged by the receivers for the received quantum data parcels.

5. The system of claim 1, wherein the initial internal exchange value of a first quantum data parcel is configured to increase upon a second quantum data parcel being received if the first quantum data parcel was received prior to the second quantum data parcel.

6. The system of claim 1, wherein each quantum data parcel in the set of quantum data parcels comprises an advantageous internal exchange value, wherein the advantageous internal exchange value is higher than other internal exchange values but only operational vis-a-vis exchanges between the controller and receivers of quantum data parcels received from the controller.

7. A designation and quantumization exchange system comprising a set of internal accounts and a set of computers connected over a network, wherein the set of computers are programmed to:

a. assign action permissions to a controller and action permissions to receivers, wherein action permissions assigned to the controller include permission to create data articles and quantum data parcels and action permissions are assigned to receivers including permission to receive quantum data parcels from the controller;

b. receive data relating to a data article, wherein the data article comprises a first reference identity parameter, wherein the first reference identity parameter identifies an external asset, wherein the external asset is external to the system;

c. receive a request from the controller to create a set of quantum data parcels using data relating to the data article, wherein each quantum data parcel in the set of quantum data parcels comprises:
  i. a second reference identity parameter, wherein the second reference identity parameter identifies the data article,
  ii. an internal exchange value parameter, wherein the internal exchange value parameter initially identifies an initial internal exchange value of the quantum data parcel internal to the system, wherein the initial internal exchange value identifies the quantity and type of other data parcels or circulation data for which the controller will exchange a given quantum data parcel with a given receiver.

8. The system of claim 7, wherein each quantum data parcel in the set of quantum data parcels additionally comprises:
  i. an advantageous internal exchange value, wherein the advantageous internal exchange value is higher than other internal exchange values but only operational vis-a-vis exchanges between the controller and receivers of quantum data parcels received from the controller after the quantum data parcels are received by the receivers.

9. The system of claim 7, wherein the data article is configured to designate the external asset.

10. The system of claim 9, wherein the data article comprises a designation parameter, wherein the designation parameter is configured to change between 'undesignated' and 'designated'.

11. The system of claim 10, wherein the set of computers are additionally programmed to change the designation parameter of the data article from 'undesignated' to 'designated' upon detecting a satisfaction event.

12. The system of claim 11, wherein the satisfaction event occurs when either an entirety of the set of quantum data parcels have been received or a pre-determined date has been reached.

13. The system of claim 11,
a. wherein the set of computers are additionally programmed to:
  upon determining that the designation parameter of the data article has been changed from 'undesignated' to 'designated:
    1. replace the initial internal exchange value with a reset internal exchange value, wherein the reset internal exchange value is higher than the initial internal exchange value.

14. A designation and quantumization exchange system comprising a set of internal accounts and a set of computers connected over a network, wherein the set of computers are programmed to:
a. receive a request from the controller to create a set of quantum data parcels, wherein each quantum data parcel in the set of quantum data parcels comprises:
  i. an internal exchange value parameter, wherein the internal exchange value parameter initially identifies an initial internal exchange value of the quantum data parcel internal to the system, wherein the initial internal exchange value identifies the quantity and type of other data parcels or circulation data for which the controller will exchange a given quantum data parcel with a given receiver;
  ii. an advantageous internal exchange value, wherein the advantageous internal exchange value is higher than other internal exchange values but only operational vis-a-vis exchanges between the controller and receivers of quantum data parcels received from the controller.

15. The system of claim 14, wherein each quantum data parcel identifies a data article.

16. The system of claim 15, wherein the data article is configured to designate an external asset, wherein the external asset is external to the system.

17. The system of claim 16, wherein the set of computers are additionally programmed to, upon detecting a satisfaction event, replace the initial internal exchange value with a reset internal exchange value, wherein the reset internal exchange value is higher than the initial internal exchange value.

18. The system of claim 17, wherein the satisfaction event occurs when either an entirety of the set of quantum data parcels have been received or a pre-determined date has been reached.

19. The system of claim 14, wherein the initial internal exchange value increases for each subsequent quantum data parcel being received within the set of quantum data parcels such that a first quantum data parcel will have a lower initial internal exchange value than a second quantum data parcel as it is being received if the first quantum data parcel is received by a receiver prior to the second quantum data parcel being received by the same receiver or a different receiver.

20. The system of claim 14, wherein the initial internal exchange value of a first quantum data parcel is configured to increase upon a second quantum data parcel being received if the first quantum data parcel was received prior to the second quantum data parcel.

* * * * *